United States Patent
Arsenault et al.

(10) Patent No.: US 8,817,965 B2
(45) Date of Patent: Aug. 26, 2014

(54) METHOD, SYSTEM AND APPARATUS FOR HANDLING ESTABLISHMENT OF A COMMUNICATION SESSION

(75) Inventors: Jonathan Allan Arsenault, Orleans (CA); Nathan Gerald Archer, Russell (CA); Sean MacLean Murray, Ottawa (CA); Ilya Kalnish, Woodbridge (CA)

(73) Assignee: BCE Inc., Verduh (CA)

(*) Notice: Subject to any disclaimer, the term of this patent is extended or adjusted under 35 U.S.C. 154(b) by 1118 days.

(21) Appl. No.: 12/374,456

(22) PCT Filed: Jul. 21, 2006

(86) PCT No.: PCT/CA2006/001199
§ 371 (c)(1),
(2), (4) Date: Jan. 20, 2009

(87) PCT Pub. No.: WO2008/009090
PCT Pub. Date: Jan. 24, 2008

(65) Prior Publication Data
US 2009/0252308 A1    Oct. 8, 2009

(51) Int. Cl.
*H04M 3/42* (2006.01)
*H04M 11/00* (2006.01)
*H04N 7/14* (2006.01)

(52) U.S. Cl.
USPC .............. 379/202.01; 379/93.01; 348/14.09

(58) Field of Classification Search
USPC .......... 379/93.01, 207.02, 202.01; 348/14.08, 348/14.09
See application file for complete search history.

(56) References Cited

U.S. PATENT DOCUMENTS 5,483,588 A * 1/1996 Eaton et al. ............. 379/202.01
5,781,731 A * 7/1998 Koreeda et al. ............. 709/204
5,944,794 A * 8/1999 Okamoto et al. ............. 709/225
6,009,333 A * 12/1999 Chaco ......................... 455/456.5
6,411,605 B1 * 6/2002 Vance et al. .................. 370/261
6,731,732 B2   5/2004 Creamer et al.
7,009,943 B2 * 3/2006 O'Neil ......................... 370/260

(Continued)

FOREIGN PATENT DOCUMENTS

EP       1 081 932 A2    7/2001
WO       WO-98/00164     12/1998

OTHER PUBLICATIONS

Cisco Systems, Inc.—PDF Reference, Cisco Meeting Place for Outlook, Rich-Media Conferencing for Microsoft Outlook, 1992-2004, 4 pages.

(Continued)

*Primary Examiner* — Christopher M Brandt
(74) *Attorney, Agent, or Firm* — Sean Murray; Murray IP Consulting Inc.

(57) ABSTRACT

According to various embodiments of the present invention, there is provided a method, system and apparatus for handling establishment of a communication session. A method of handling establishment of one or more communication sessions comprises receiving from a user an indication of user's desire to cause establishment of the one or more communication sessions. The method further comprises accessing scheduling data associated with the user, the scheduling data comprising one or more scheduling events, each of the one or more scheduling events associated with a corresponding one of the one or more communication sessions. The method further comprises in response to at least one of the one or more scheduling events, causing the corresponding one of the one or more communication sessions to be established with the communication device associated with the user.

90 Claims, 12 Drawing Sheets

(56) References Cited

U.S. PATENT DOCUMENTS

| | | |
|---|---|---|
| 2002/0034289 A1 | 3/2002 | Pershan |
| 2002/0136382 A1* | 9/2002 | Cohen et al. ............. 379/202.01 |
| 2003/0053612 A1* | 3/2003 | Henrikson et al. ....... 379/202.01 |
| 2004/0001446 A1 | 1/2004 | Bhatia et al. |
| 2004/0083282 A1* | 4/2004 | Shiga et al. ................... 709/223 |
| 2004/0215784 A1* | 10/2004 | Qi et al. ........................ 709/227 |
| 2005/0018826 A1* | 1/2005 | Benco et al. ............. 379/202.01 |
| 2005/0018827 A1 | 1/2005 | Himmel et al. |
| 2005/0034079 A1* | 2/2005 | Gunasekar et al. ........... 715/753 |
| 2005/0141688 A1 | 6/2005 | Wengrovitz |
| 2005/0174951 A1* | 8/2005 | Schrader et al. .............. 370/260 |
| 2005/0226172 A1 | 10/2005 | Richardson et al. |
| 2005/0227680 A1 | 10/2005 | Snowden |
| 2005/0233743 A1* | 10/2005 | Karaoguz et al. .......... 455/432.3 |
| 2006/0050686 A1* | 3/2006 | Velez-Rivera et al. ........ 370/352 |
| 2006/0062368 A1* | 3/2006 | Saha et al. ............... 379/202.01 |
| 2006/0095556 A1* | 5/2006 | Arnold et al. ................. 709/223 |
| 2006/0095575 A1 | 5/2006 | Sureka et al. |
| 2006/0109837 A1* | 5/2006 | Saha et al. ..................... 370/352 |
| 2006/0187859 A1* | 8/2006 | Shaffer et al. ................. 370/260 |
| 2006/0217967 A1* | 9/2006 | Goertzen et al. .............. 704/201 |
| 2006/0277282 A1 | 12/2006 | Christensen et al. |
| 2007/0033251 A1* | 2/2007 | Mandalia et al. ............. 709/204 |
| 2007/0081654 A1* | 4/2007 | Toy et al. ................... 379/211.02 |
| 2007/0115919 A1* | 5/2007 | Chahal et al. ................. 370/352 |
| 2008/0013706 A1* | 1/2008 | Kelley et al. ............. 379/202.01 |
| 2009/0019367 A1* | 1/2009 | Cavagnari et al. ............ 715/716 |
| 2009/0252308 A1* | 10/2009 | Arsenault et al. .......... 379/93.01 |

OTHER PUBLICATIONS

Notice of References Cited for U.S. Appl. No. 12/159,438, mailed with Office Action of Nov. 10, 2010.

Cisco Meeting Place for Outlook Rich-media Coferencing, http://www.cisco.com/application/pdf/en/us/guest/products/ps5880/c1650/cdccont 0900aecd800fa52a.pdf, 1992-2004, Cisco.

* cited by examiner

METHOD, SYSTEM AND APPARATUS FOR HANDLING ESTABLISHMENT OF A COMMUNICATION SESSION

FIELD OF THE INVENTION

This invention relates to the field of telecommunications in general and, more specifically, to a method, system and apparatus for handling establishment of a communication session.

BACKGROUND OF THE INVENTION

Communication devices, such as landline telephones, wireless communication devices and voice-over-IP telephones, offer a user an ever-increasing opportunity to stay connected no matter where the user is. Generally speaking, in order to establish a communication session (for example, to place an outgoing call) the user needs to know a telephone number (or another termination identifier) associated with the destination party to initiate the outgoing call. Several communication devices are equipped with an "address book" and speed dial functionality to enable the user to record termination identifiers (such as a telephone number, for example) associated with a number of potential destination parties and to initiate the outgoing call by pressing a speed dial button or otherwise selecting a name from the address book.

With the increasing travel costs and overall pressures on businesses to control costs, more and more enterprises encourage their employees to conduct so called "virtual meetings" or, in other words, rely on telecommunication devices to conduct meetings. A "conference call" is a feature provided by telecommunication service providers or by dedicated multi-party call solutions providers that enables multiple parties to join a so-called "conference bridge" to conduct a multi-party call. A multi-party call dial-in number (usually a local access and/or a toll free number) and a multi-party call identifier are assigned to a conference bridge. A multi-party call organizer provides the multi-party call dial-in number and the multi-party call identifier to potential multi-party call participants who are to join the multi-party call. A potential multi-party call participant initiates a call using the multi-party call dial-in number and, once connected to the multi-party call provider, provides the multi-party call identifier, which allows the potential multi-party call participant to be connected to the conference bridge.

Accordingly, in order to join the multi-party call, the potential multi-party call participants need to know the multi-party call dial-in number and the multi-party call identifier. With advent of scheduling applications, such as Microsoft® Outlook® and the like, it has become customary to record the multi-party call dial-in number and the multi-party call identifier in a record maintained by the scheduling application. Even though this provides an effective means to record the information, some potential multi-party call participants may still experience an inconvenience when attempting to join the multi-party call.

Consider a scenario where a potential multi-party call participant makes use of a communication device which provides both access to a scheduling application and telephony functionality, such as a case with BlackBerry® devices provided by Research In Motion of 295 Phillip Street, Waterloo, Ontario, Canada. This type of device generally enables the user to perform a single function: either check the scheduling application or use the telephony function. Even through the potential multi-party call participant can access the scheduling application and even use built-in functionality that enables the BlackBerry device to recognize the multi-party call dial-in number contained in the record in the scheduling application and initiate an outgoing call to the multi-party call dial-in number, the potential multi-party call participant still needs to find a way to remember the multi-party call identifier. The potential multi-party call participant has to either jot down the multi-party call identifier on a piece of paper or find another communication device to originate the outgoing call to the multi-party call dial-in number, while using the BlackBerry device as means to retrieve the multi-party call identifier maintained in the scheduling application.

The problem is further exacerbated when a potential multi-party call participant attempts to join a multi-party call without having access to a scheduling application. Examples of such a situation are countless, but to name a few, the potential multi-party call participant may be using a cell phone that does not provide access to a scheduling application, the potential multi-party call participant may be driving, at home and the like.

This can clearly be considered a nuisance by some users and there is clearly a need in the art for an improved manner in which a user can initiate a communication session.

SUMMARY OF THE INVENTION

According to a first broad aspect of the present invention, there is provided a method of handling establishment of a communication session. The method comprises receiving an indication of user's desire to establish the communication session. The method further comprises accessing a memory for maintaining scheduling data in an attempt to retrieve at least one call parameter associated with the communication session. The method further comprises causing the communication session to be established with a communication device associated with the user via a communication network using the at least one call parameter.

According to a second broad aspect of the present invention there is provided a system for handling establishment of a communication session. The system comprises a communication session handling entity, which is operable to receive from a user an indication of user's desire to establish the communication session. The communication session handling entity is further operable to access a memory for maintaining scheduling data in an attempt to retrieve at least one call parameter associated with the communication session. The communication session handling entity is further operable to cause the communication session to be established from a communication device associated with the user via a communication network using the at least one call parameter.

According to a third broad aspect of the present invention, there is provided an apparatus for handling establishment of a communication session. The apparatus comprises: means for receiving from a user an indication of user's desire to establish the communication session; means for accessing a memory for maintaining scheduling data in an attempt to retrieve at least one call parameter associated with the communication session; and means for causing the communication session to be established from a communication device associated with the user via a communication network using the at least one call parameter.

According to a fourth broad aspect of the present invention, there is provided a method of handling establishment of one or more communication sessions. The method comprises receiving from a user an indication of user's desire to cause establishment of the one or more communication sessions. The method further comprises accessing scheduling data associated with the user, the scheduling data comprising one or more scheduling events, each of the one or more scheduling events associated with a corresponding one of the one or more communication sessions. The method further comprises, in response to at least one of the one or more scheduling events, causing the corresponding one of the one or more communication sessions to be established with the communication device associated with the user.

According to another broad aspect of the present invention, there is provided system for handling establishment of one or more communication sessions. The system comprises a communication session handling entity, which is operable to receive from a user an indication of user's desire to cause establishment of the one or more communication sessions; access scheduling data associated with the user, the scheduling data comprising one or more scheduling events, each of the one or more scheduling events associated with a corresponding one of the one or more communication sessions; in response to at least one of the one or more scheduling events, cause the corresponding one of the one or more communication sessions to be established with a communication device associated with the user.

According to yet another broad aspect of the present invention, there is provided an apparatus for handling establishment of one or more communication sessions. The apparatus comprises means for receiving from a user an indication of user's desire to cause establishment of the one or more communication sessions. The apparatus further comprises means for accessing scheduling data associated with the user, the scheduling data comprising one or more scheduling events, each of the one or more scheduling events associated with a corresponding one of the one or more communication sessions. The apparatus further comprises means for, in response to at least one of the one or more scheduling events, causing the corresponding one of the one or more communication sessions to be established with a communication device associated with the user.

These and other aspects and features of the present invention will now become apparent to those skilled in the art upon review of the following description of specific embodiments of the invention in conjunction with the accompanying drawings.

BRIEF DESCRIPTION OF THE DRAWINGS

Embodiments of the present invention are described with reference to the following figures, in which.

It is to be expressly understood that the description and drawings are only for the purpose of illustration of certain embodiments of the invention and are an aid for understanding. They are not intended to be a definition of the limits of the invention.

DETAILED DESCRIPTION OF THE EMBODIMENTS

According to various non-limiting embodiments of the present invention, there is provided a method, system and apparatus for handling establishment of a communication session on the basis of at least one call parameter maintained within scheduling data. How such scheduling data is generated and maintained should not be used to limit the scope of the present invention. However, for illustration purposes only, several non-limiting examples of how such scheduling data can be generated will now be described with reference to FIG. 1.

Figure 1:
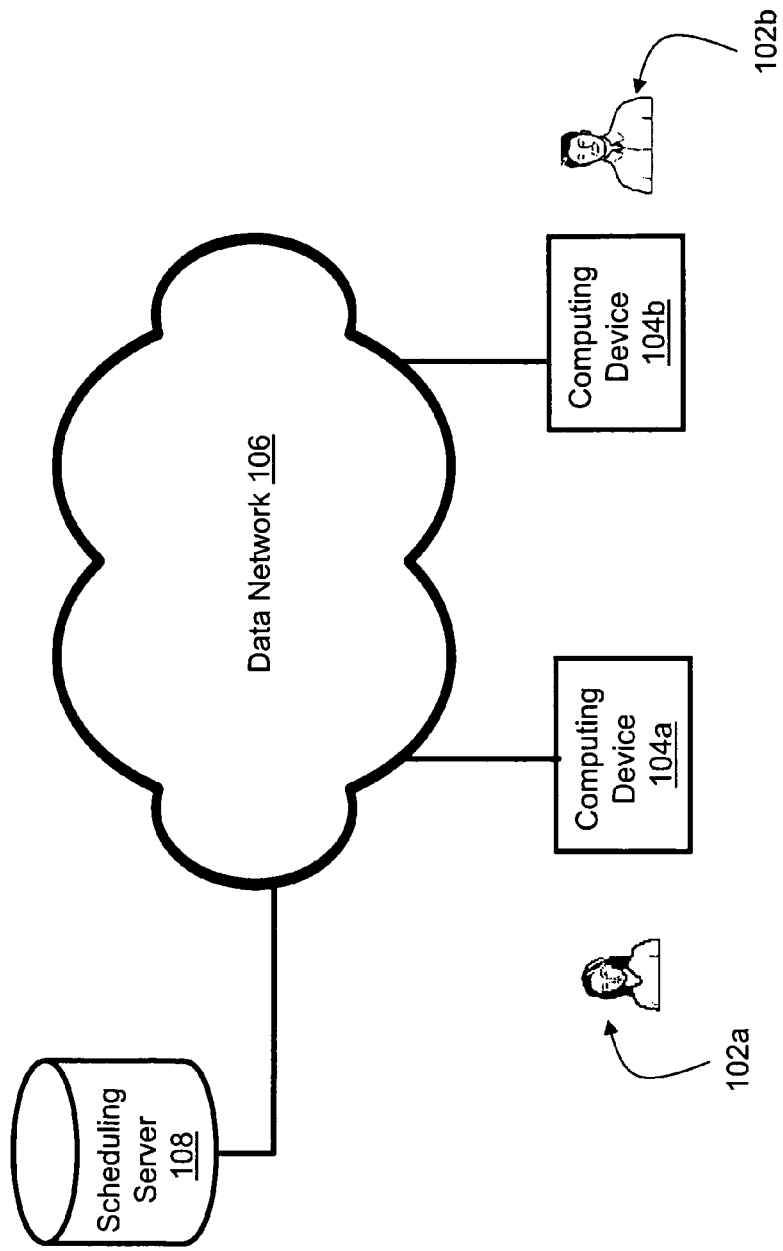
FIG. 1 is a schematic diagram representing various components of a non-limiting example of an infrastructure for generating and maintaining scheduling data.

FIG. 1 depicts a user 102a that can employ a computing device 104a to establish a communication session via a data network 106. The data network 106 can comprise a WAN, a LAN, a wireless data network, a combination thereof or any other suitable type of a data network. The computing device 104a can comprise a desktop computer, a laptop, a PDA, a wireless communication device and the like. Connected to the data network 106 can be a computing device 104b, which can be, for example, associated with a user 102b. The computing device 104b can be substantially similar to the computing device 104a.

Using the computing device 104a (or another computing apparatus), the user 102a may access a scheduling application. Examples of scheduling applications include, but are not limited to, Microsoft® Outlook®, Lotus Notes®, 30Boxes®, Google® Calendar, Applet iCal, Schedule World®, K-Organizer®, Lovento®, Mozilla Calendar®, Mulberry®, Novell Evolution®, Kronolith®, Simple Groupware®, Web Calendar®, Windows® Calendar, Nuvvo®, Upcoming.org, AiAi® and the like. It should be noted that the type of the scheduling application should not be used to limit the invention.

In the non-limiting embodiment depicted in FIG. 1, the scheduling application can access a scheduling server 108, which is coupled to the data network 106 and is accessible by the computing device 104a via the data network 106. In these non-limiting embodiments, once the user 102a executes the scheduling application using the communication device 104a, the communicating device 104a accesses the scheduling server 108 via the data network 106 and retrieves scheduling data to present via the scheduling application to the user 102a. This arrangement can be particularly useful in enterprise-based scheduling systems and web-based scheduling systems.

In another non-limiting embodiment of the present invention, the scheduling data can be maintained locally on the computing device 104a. In yet another alternative non-limiting embodiment, the scheduling data can be maintained locally on the computing device 104a with a copy of the scheduling data being maintained at the scheduling server or vice versa 108. In these non-limiting embodiments, the scheduling data maintained locally and the scheduling data maintained at the scheduling server 108 can be synchronized from time to time, as is known to those of skill in the art.

Naturally, the computing device 104b can also be connectable to the scheduling server 108 or, alternatively, the computing device 104b can be connectable to another scheduling server (not depicted). For that matter, the scheduling application being executed on the computing device 104a can be the same as the scheduling application executed on the computing device 104b. Alternatively, the scheduling application being executed on the computing device 104a can be different from the scheduling application executed on the computing device 104b. In another non-limiting embodiment of the present invention, the computing device 104b may not execute a scheduling application or the computing device 104b can be omitted altogether.

Using the scheduling application, the user 102a can, inter alia, schedule an appointment, send out a meeting invite, preview appointments and receive an appointment reminder.

How the scheduling data is generated can be broadly categorized into four broad non-limiting categories:
  (i) the user 102a receives and accepts a meeting invite associated with a particular scheduling event;
  (ii) the user 102a manually enters scheduling data associated with the particular scheduling event;
  (iii) the user 102a generates a meeting invite that contains scheduling data associated with the particular scheduling event; and
  (iv) the user 102a is part of a group that has central scheduling data associated with the particular scheduling event.

It should be explicitly understood that these four broad categories are presented for illustration purposes only and should not be used to limit this invention in any way. Other alternatives are possible and can be used without departing from the teachings of this invention. These four non-limiting broad categories will now be described in greater detail, as an example only:

(i) The User 102a Receives a Meeting Invite Containing Scheduling Data Associated with a Particular Scheduling Event The user 102a may receive a meeting invite from another user (such as the user 102b), the meeting invite containing scheduling data associated with a particular scheduling event that the user 102b is trying to organize. Such a scheduling event can, for example, be associated with a call between the user 102a and the user 102b; and the user 102a is supposed to originate the call. In these non-limiting embodiments of the present invention, the scheduling data associated with the scheduling event can comprise at least one call parameter which can be manifested in a termination identifier associated with a communication device associated with the user 102b.

In an alternative implementation, the scheduling event can be associated with a multi-party call that can be organized by the user 102b. In this non-limiting embodiment of the present invention, the scheduling data associated with the scheduling event can comprise at least one call parameter that can be manifested as a multi-party call dial-in number and as a multi-party call identifier. Alternatively, if the multi-party call dial-in number uniquely identifies a particular multi-party call, the scheduling data associated with the scheduling event can comprise just the multi-party call dial-in number; and the multi-party call identifier can be omitted. In yet another alternative embodiment of the present invention, the scheduling data associated with the scheduling event can comprise a termination identifier associated with a communication device associated with the multi-party call organizer, the call to which can be forwarded to a multi-party call handling entity by a network element.

In a non-limiting example to be presented herein below, it is assumed that the user 102b wishes to organize a multi-party call and, among other participants, the user 102b needs to invite the user 102a to the multi-party call to be organized. The user 102b can access his or her scheduling application and enter a scheduling event associated with a particular time and date, the scheduling event comprising scheduling data that can include, but is not limited to: (a) time of the multi-party call; (b) duration of the multi-party call; (c) at least one multi-party call parameter, such as, but not limited to, a multi-party call dial-in number, a multi-party call identifier, a combination of the two and the like.

The time of the multi-party call and the duration of the multi-party call can be entered in a manner well known in the art. For example, in non-limiting embodiments where the scheduling application is embodied in Microsoft Outlook, the time and duration of the multi-party call can be entered using "Start Time" and "End Time" fields of the new task entry form.

The at least one multi-party call parameter can be entered using one of several non-limiting approaches:

Free-Form Entry

In this non-limiting approach, the user 102b can enter data representative of the multi-party call parameter in a free-entry form, such as but not limited to:
  Multi-party call dial-in number: 1-800-255-6599 Multi-party call identifier: 256889
  Or, alternatively, as:
  Multi-party call-in number: 1-800-255-6599/Multi-party call identifier: 256889
  In yet another alternative, the data representative of the multi-party call parameter can be entered as:
  1-800-255-6599/256889
  Or alternatively as:
  256889/1-800-255-659
  In another non-limiting scenario, which is particularly true where the multi-party call dial-in number uniquely identifies a particular multi-party call, the data representative of the multi-party call parameter can be entered as:
  Multi-party call dial-in number: 444.888.2266

It should be noted that a number of other free-form entry formats are possible. In a specific non-limiting example of the scheduling application being embodied in Microsoft Outlook, the user 102b can enter the indication of the multi-party call parameter using the free-form entry in a body of the new task entry form.

Structured Template Entry

In this non-limiting approach, the aforementioned scheduling application can present the user 102b a structured template for entering the multi-party call parameter. For example, the scheduling application can present the user 102b two entry fields, one labelled "Multi-party call Dial-in Number" and the other labelled "Multi-party call Identifier". Alternatively, the entry field can be labelled "Telephone Number". It should be noted that any other suitable descriptive or non-descriptive field label can be equally used. It should be further noted that the scheduling application can present a number of other fields within the structured template to solicit various types of inputs from the user 102b.

Semi-Structured Template Entry

In this non-limiting approach, the aforementioned scheduling application can present the user 102b a semi-structured template for entering the multi-party call parameter. For example, the scheduling application can present the user 102b a single entry field, labelled "Location" or "Meeting Details". The user 102b can enter the multi-party call identifier into the single entry field in the following manner, as an example:
  Call-in number: 1-800-255-6599/Call identifier: 256889
  Alternatively, any other example presented herein above can be used. In a specific non-limiting example of the scheduling application being embodied in Microsoft Outlook, the semi-structured template can be embodied in a "Location" field of the new task entry form. It should be noted that any other suitable descriptive or non-descriptive field label can be equally used.

The user 102*b* can then transmit the scheduling data associated with the multi-party call to the potential multi-party call participants, which include the user 102*a*. In a non-limiting embodiment of the present invention, using the scheduling application, the user 102*b* can send a so-called meeting invite to the multi-party call participants, which include the user 102*a*. How this meeting invite is transmitted between the scheduling application executed on the computing device 104*b* and the scheduling application executed on the computing device 104*a* is known in the art and, as such, need not be described here at length. Suffice it to say that transmission of the meeting invite between the computing device 104*b* and the computing device 104*a* causes the scheduling application executed on the computing device 104*a* to be updated with the scheduling data including, for example: (a) time of the multi-party call; (b) duration of the multi-party call; (c) at least one multi-party call parameter, such as but not limited to a multi-party call dial-in number, a multi-party call identifier, a combination of the two and the like.

In alternative non-limiting embodiments, the user 102*b* can communicate the scheduling data to the user 102*a* by means other then transmitting the meeting invite. For example, the user 102*b* can establish a voice call with the user 102*a* using any suitable communication device and provide the scheduling data to the user 102*a* via the voice call. In an alternative non-limiting implementation, the user 102*b* can transmit the scheduling data to the user 102*a* (as well as other potential multi-party call participants) by sending an e-mail containing the meeting information, by transmitting an Instant Message, by sending an SMS message and the like. In these non-limiting scenarios, the user 102*a* can input the scheduling data into his or her scheduling application using the computing device 104*a*.

(ii) The User 102*a* Manually Enters Scheduling Data Associated with a Particular Scheduling Event In this non-limiting scenario, the user 102*a* may need to schedule a call with a destination party, i.e. the user 102*b*. Using the scheduling application executed on the computing device 104*a*, the user 102*a* can generate a scheduling event associated with the day and time for when the call with the destination party is scheduled for. As part of the scheduling event, the user 102*a* can enter at least one call parameter, which can be a termination identifier (such as a telephone number, an IP address, a SIP address and the like) associated with a communication device used by the destination party.

How the user 102*a* enters the at least one call parameter is not particularly limited and any one of the above-described free-form, semi-structured template or structured template approaches can be used. Naturally, any other suitable approach for entering the at least one call parameter into the scheduling event can be used.

Alternatively, if the user 102*a* needs to join a multi-party call at a particular day and time, the user 102*a* can generate a scheduling event and manually type in the multi-party call dial-in number and, if required, the multi-party call identifier.

(iii) The User 102*a* Generates a Meeting Invite that Contains Scheduling Data Associated with a Scheduling Event This non-limiting scenario is a reverse to what was presented in the non-limiting scenario described at (i) above. In this non-limiting scenario, it is the user 102*a* who generates a meeting invite associated with a scheduling event. The scheduling event can be associated with a multi-party call. Alternatively, the scheduling event can be associated with a call to a destination party (for example, the user 102*b*). Irrespective of the type of the scheduling event, the user 102*a* can generate a meeting invite destined to other user(s) who need to be aware of the scheduling data associated with the scheduling event. While generating such a meeting invite, the user 102*a* enters scheduling data (including at least one call parameter) into a scheduling application executed at the computing device 104*a*. How the user 102*a* enters the at least one call parameter is not particularly limited and, as such, any one of the above-described free-form, semi-structured template or structured template approaches can be used. Naturally, any other suitable approach for entering the at least one call parameter into the scheduling event can be used.

(iv) The User 102*a* is Part of a Group that has Central Scheduling Data Associated with the Particular Scheduling Event In this non-limiting scenario the user 102*a* may be part of a group, the group being associated with scheduling data that maintains one or more scheduling events that all members of the group need to be aware of. For example, each (or some) member(s) of the group (including the user 102*a*) may need to attend a particular multi-party call at a particular time. In this scenario, the scheduling data associated with the group may be maintained at the scheduling server 108 (or another suitable scheduling server), the scheduling data maintaining a scheduling event associated with the multi-party call. In some non-limiting embodiments of the present invention, the scheduling data associated with the group can also maintain user identifier(s) associated with each member of the group, including the user identifier associated with the user 102*a*. This enables each member of the group to access the centralized scheduling data and review scheduling events associated with the group that they belong to. In an alternative non-limiting embodiment of the present invention, all members of the particular group can use a single user identifier and/or password to access the centralized scheduling data.

Effectively, the user 102*a* has generated a scheduling event that contains at least one call parameter that is maintained within scheduling data associated with the user 102*a*.

Irrespective of which non-limiting approach to generate a scheduling event is employed, the scheduling data maintained by the scheduling server 108 for the user 102*a* is updated with the scheduling event that contains at least one call parameter associated with a communication session that needs to be established in association with the scheduling event (such as, but not limited to, a communication session to join a multi-party call, a communication session to call a particular destination party, etc.).

It should be explicitly understood that the process for generating and maintaining the scheduling data described above is presented as an example only and should not be used to limit the invention in any way. Provided that scheduling data associated with the user 102*a* is maintained at the scheduling server 108 or the computing device 104*a*, it is possible to perform a method for handling establishment of a communication session according to various embodiments of the present invention.

Figure 2:
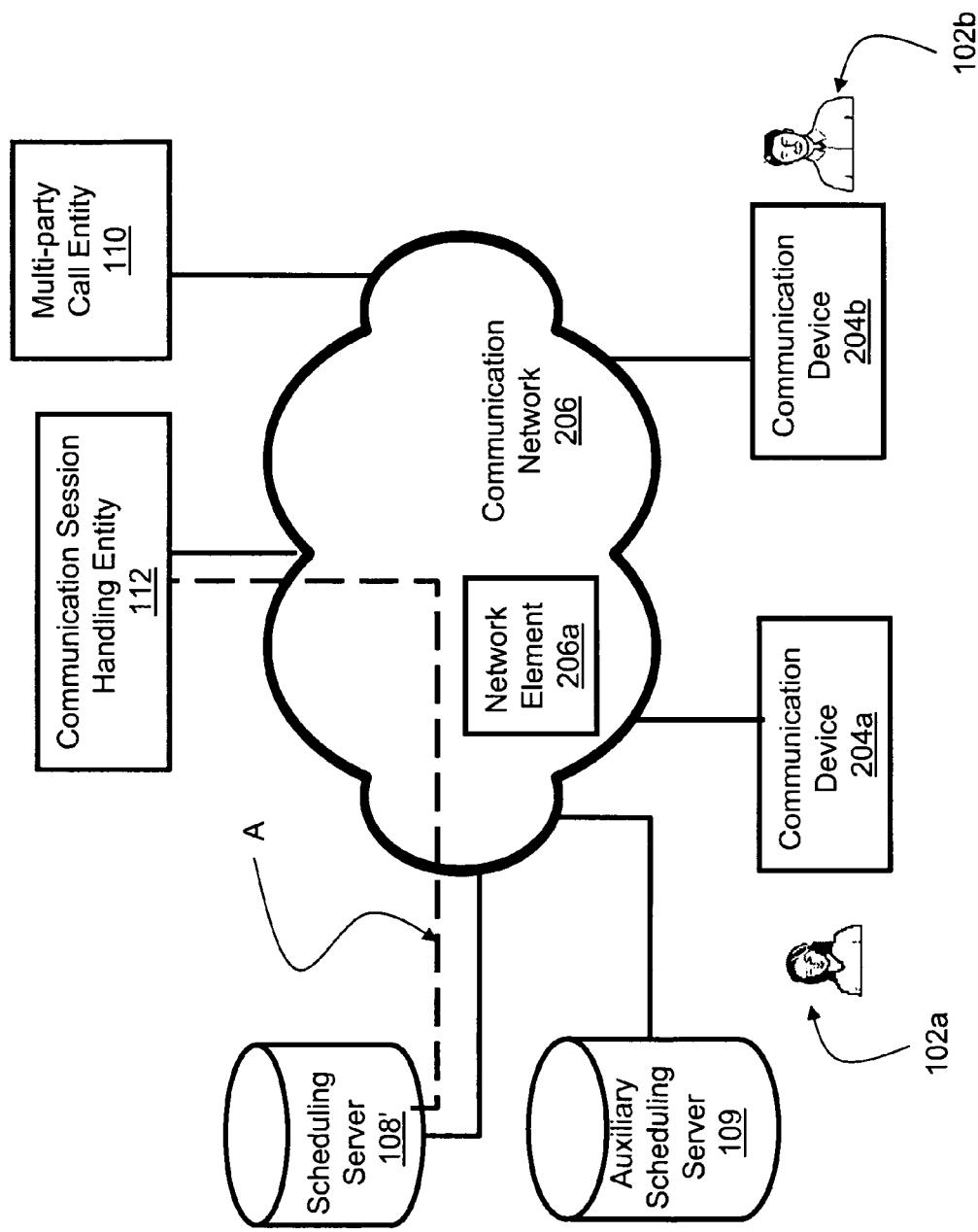
FIG. 2 depicts a system for handling establishment of a communication session according to a non-limiting embodiment of the present invention.

Reference is now made to FIG. 2 which depicts a system for handling establishment of a communication session according to a non-limiting embodiment of the present invention. In the non-limiting embodiment to be described below with reference to FIG. 2, the user 102*a* employs a communication device 204*a* to establish a communication session via a communication network 206. In some embodiments of the present invention, the communication network 206 can comprise the above-mentioned data network 106. Alternatively, the communication network 206 can comprise the Public Switched Telecommunications Network (PSTN), a data network adapted for handling VoIP calls (such as a WAN, a LAN and the like), a wireless communication network, a Private Branch Exchange (PBX) system, a combination thereof and the like. The communication device 204a can comprise a Plain Old Telephone Service (POTS) phone, a VoIP phone, a wireless communication device, a POTS phone equipped with an Analog Telephone Adapter (ATA), a computing apparatus operable to execute a soft client for originating and maintaining a VoIP call, a PDA and the like. Naturally, the type of the communication device 204a will depend on the type of the communication network 206. For example, in a non-limiting scenario, where the communication network 206 is embodied in the data network adapted for handling VoIP calls (such as, for example, the Internet), the communication device 204a can comprise the VoIP phone, the POTS phone equipped with the ATA or the computing apparatus operable to execute a soft client for originating and maintaining a VoIP call. Alternatively, the communication device 204a can comprise a POTS phone which can connect to the communication network 206 via a gateway (not depicted). It should be noted that in some non-limiting embodiments of the present invention, the communication device 204a can comprise the aforementioned computing device 104a.

Connected to the communication network 206 can be a number of other communication devices, such as, for example, a communication device 204b, which may be associated with another user (such as the user 102b). The communication device 204b can be similar to the communication device 204a and, as such, can be embodied in a Plain Old Telephone Service (POTS) phone, a VoIP phone, a wireless communication device, a POTS phone equipped with an Analog Telephone Adapter (ATA), a computing apparatus operable to execute a soft client for originating and maintaining a VoIP call, a PDA and the like. It should be further noted that in some non-limiting embodiments of the present invention, the communication device 204b can comprise the aforementioned computing device 104b. A number of other communication devices can be connected to the communication network 206, which have been omitted from FIG. 2 for the sake of simplicity.

In some non-limiting embodiments of the present invention, the communication device 204a can be of the same type as the communication device 204b (for example, both can comprise a POTS phone or a VOIP phone). In alternative non-limiting embodiments of the present invention, the communication device 204b and the communication device 204a can be of a different type. For example, in a non-limiting embodiment of the present invention, the communication network 206 can comprise a portion of the PSTN and a portion of the data network adapted for handling VoIP calls. In this example, the communication device 204b can be a POTS phone coupled to the PSTN portion of the communication network 206, while the communication device 204a can be a VoIP phone coupled to the data network portion of the communication network 206. Naturally, in these non-limiting embodiments of the present invention, the communication network 206 can comprise a gateway (not depicted) for facilitating communication between the PSTN and the data network portions, as is well known in the art.

The communication network 206 can comprise a number of network elements, such as a network element 106a. In the above-described non-limiting scenario, where the communication network 206 comprises the data network adapted for handling VoIP calls, the network element 206a can comprise what is referred to in the industry as a "packet switch" or a "soft switch", which can comprise circuitry, software and/or control logic for providing various communication services to the communication device 204a. Examples of such communication services include:

(i) connecting incoming calls to the communication device 204a; and
(ii) handling outgoing calls originated from the communication device 204a.

Other examples of communication services that can be performed by the network element 206a can include, but are not limited to, call waiting, call forwarding, and so on.

In addition, in these non-limiting embodiments of the present invention, the network element 206a can comprise suitable circuitry, software and/or control logic for exchanging calls with entities outside the communication network 206, for example with entities connected to the PSTN (not depicted). A non-limiting example of the network element 206a can be embodied in a MCS 5200 Soft Switch manufactured by Nortel Networks Ltd. of 8200 Dixie Road, Brampton, Ontario L6T 5P6, Canada.

In another above-described non-limiting scenario, where the communication network 206 is embodied in the PSTN, the network element 206a can comprise a switch. An example network element 206a can be embodied in a DMS 100 or DMS200 switch provided by Nortel Networks Ltd. It should be noted that any other suitable switch can be used.

In some non-limiting embodiments of the present invention, the communication device 204b can also be served by the network element 206a. In another non-limiting embodiment of the present invention, the communication network 206 can comprise a number of additional network elements (not depicted). For example, in some non-limiting embodiments of the present invention, the communication device 204a and the communication device 204b can be served by a respective network element.

Irrespective of the type of the network element 206a deployed, the network element 206a can comprise suitable circuitry and memory to maintain a mapping associated with different services that can be invoked by a user (such as the user 102a employing the communication device 204a) by keying in a pre-determined sequence of digits. An example non-limiting embodiment of such a mapping will now be described with reference to FIG. 3.

Figure 3:
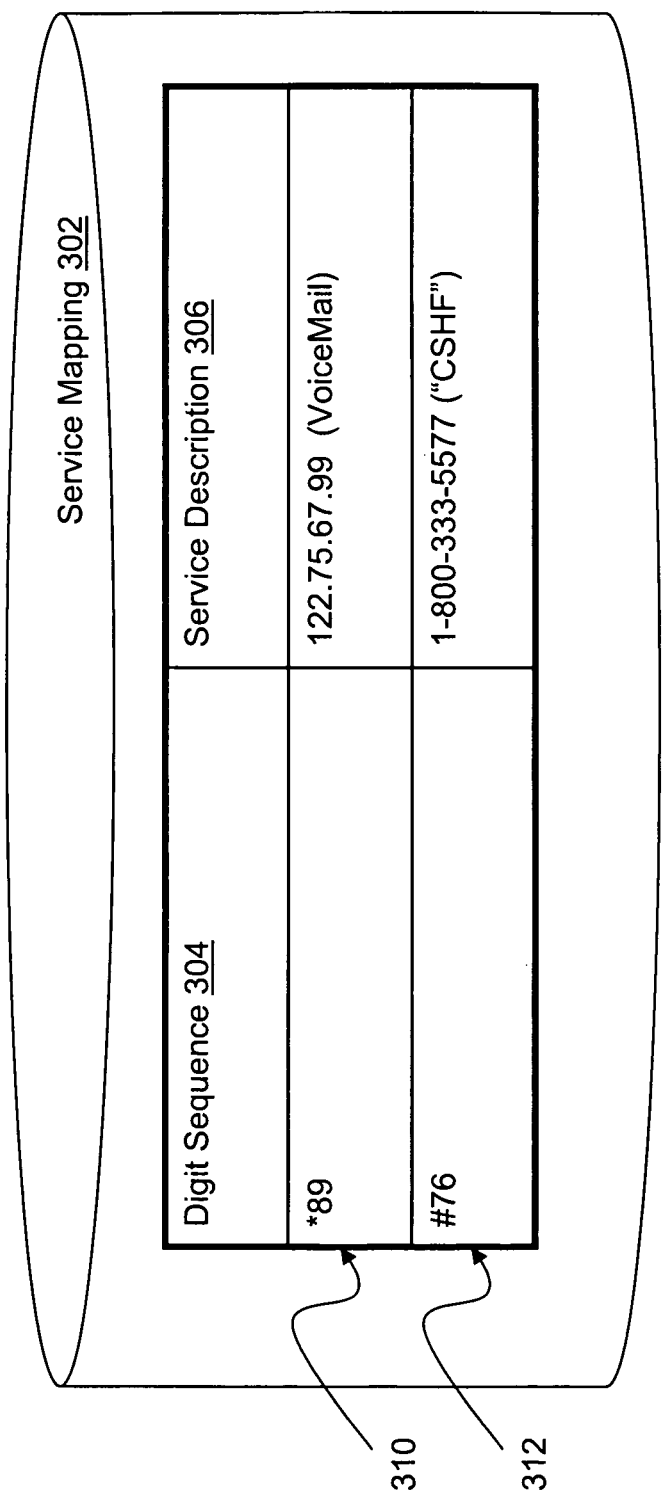
FIG. 3 is a schematic diagram representing a non-limiting embodiment of a service mapping maintained by a network element of FIG. 2.

FIG. 3 denotes a specific non-limiting embodiment of a service mapping 302 that can be maintained by the aforementioned network element 206a. The service mapping 302 can comprise a number of records, such as records 310 and 312. Each of the maintained records denotes a relationship between a digit sequence 304 and a service description 306. The purpose of the digit sequence 304 is to identify a particular combination of digits (sometimes referred to by those of skill in the art as a "short code") that can be used to trigger a particular service. Some examples of the data maintained in the digit sequence 304 field can include, but are not limited to, "*11", "*#5699", "#2", "7566" and the like. It should be noted that any suitable combination of digits and other symbols can be used. The service description 306 denotes what service is triggered by a specific sequence of digits maintained in the corresponding digit sequence 304 field. The service description 306 field can include a type of the service, a termination identifier associated with a service provider who is providing the service, billing details and the like.

To illustrate, the record 310 can be maintained for a specific service triggered by a specific sequence of digits. The record 310 can maintain digit sequence 304 for the combination of digits "*89". The corresponding service description 306 field can contain "122.75.67.99 (VoiceMail)" denoting that if the network element 206a receives a short code "*89", it is to trigger a connection to a voicemail provider at an IP address 122.75.67.99.

Similarly, the record 312 can be maintained for another specific service triggered by another specific sequence of digits. The record 312 can maintain the digit sequence 304 for the combination of digits "#76". The corresponding service description 306 field can contain "1-800-333-5577 ("CSHF")" denoting that if the network element 206a receives a short code "#76", it is to trigger a connection to a server that provides a Communication Session Handling Feature contemplated herein, as will be described in greater detail herein below. In the specific non-limiting embodiment depicted in FIG. 3, the server can be reached at a telephone number 1-800-333-5577. It should be noted that in an alternative non-limiting embodiment of the present invention, the server can be reached at another suitable network address, such as, for example, an IP address, a SIP address, a proprietary network identifier and the like.

It should be noted that the service mapping 302 can maintain a number of other records associated with other short codes and other associated services, which have been omitted from FIG. 3 for the sake of simplicity. It should be further noted that how data is maintained within the digit sequence 304 and the service description 306 fields is not particularly limiting and that the above example was provided merely as an illustration and, as such, should not be used to limit the scope of this invention.

Returning to FIG. 2, in a non-limiting embodiment depicted in FIG. 2, further connected to the communication network 206 can be a scheduling server 108'. The scheduling server 108' can be substantially similar to the scheduling server 108 described above.

In some non-limiting embodiments of the present invention, there can be provided an auxiliary scheduling server 109. The auxiliary scheduling server 109 can be substantially similar to the scheduling server 108'. In some non-limiting embodiments of the present invention, the scheduling server 108' can comprise a scheduling server, such as a Microsoft Outlook server, that maintains work-related scheduling data for the user 102a and the auxiliary scheduling server 109 can comprise a scheduling server, such as a Google Calendar server, which maintains personal scheduling data for the user 102a. Naturally, the scheduling server 108' and the auxiliary scheduling server 109 can maintain any other type of scheduling data, as well as data other than scheduling data.

Within FIG. 2, there is further provided a multi-party call entity 110 connected to the communication network 206. The purpose of the multi-party call entity 110 is to provide multi-party call services to subscribing users, such as the user 102a and/or the user 102b. The multi-party call entity 110 can be managed by the same service provider that manages the communication network 206 or, alternatively, by a separate entity. The multi-party call entity 110 comprises the necessary devices, switches, memory and processors to create, assign and maintain multi-party calls. An example of a multi-party call entity 110 is provided and managed by Bell Conferencing Inc. of 10 Four Seasons East, 10th Floor, Etobicoke, ON, Canada. In an alternative non-limiting embodiment of the present solution, the functionality of the multi-party call entity 110 can be integrated with the network element 206a. In alternative non-limiting embodiments of the present invention, the functionality of the multi-party call entity 110 can be incorporated in any other entity coupled to the communication network 206, for example, the communication device 204a, the communication device 204b, the scheduling server 108' and the like.

In some non-limiting embodiments of the present invention, the multi-party call entity 110 is operable to deliver "meet me" type of multi-party calls, where potential multi-party call participants are issued with the multi-party call dial-in number and optionally the multi-party call identifier. The multi-party call entity 110 can further be operable to deliver so-called host originated multi-party calls, where the multi-party call entity 110 is operable to establish a communication session with each of the required participants at a pre-determined telephone number (or another termination identifier, such as an IP address, a SIP address and the like). The multi-party call entity 110 can further be operable to deliver multi-media multi-party calls, which may include one or more of a voice portion, a video portion, a data portion and the like.

Also connected to the communication network 206 can be a communication session handling entity 112. The communication session handling entity 112 can be managed by the same service provider that manages the multi-party call entity 110; the same service provider that manages the communication network 206, the same service provider that manages the scheduling server 108', the same service provider that manages the auxiliary scheduling server 109 or by another entity. The communication session handling entity 112 can be reached via the communication network 206 at a network address. The network address can be embodied in an IP address, a telephone number, a SIP address, a proprietary network identifier and the like. It will be recalled that an indication of the network address associated with the communication session handling entity 112 can be maintained within the aforementioned service description 306 field of the service mapping 302 maintained by the network element 206a.

Among other functions, the communication session handling entity 112 can perform one or more of the following functions: analyze signalling information (such as SS7 signalling information, SIP signalling information and the like), obtain Calling Line Identification (CLID) information, initiate outgoing calls, detect and interpret DTMF signals, capture speech utterances, apply speech recognition routines and the like. In some embodiments of the present invention, the communication session handling entity 112 can comprise an application server. An example communication session handling entity 112 can be embodied as a Ubiquity Application Server, which can be provided by Ubiquity of 515 Legget Drive, Suite 400, Ottawa, ON, Canada. It should be understood that any other suitable server comprising suitable processing logic can be employed for the purposes of the embodiments of the present invention, and that as one skilled in the art will appreciate, the processing logic may depend on the type of signalling information used by the communications network 106 and the type of processing required.

In another non-limiting embodiment of the present invention, the multi-party call entity 110 can be omitted. It should be recalled that in some non-limiting embodiments of the present invention, the communication session handling entity 112 is operable to handle establishment of a communication session with a particular destination party. In these embodiments, there may be no need for the multi-party call entity 110.

In some non-limiting embodiments of the present invention, the communication session handling entity 112 can be operable to establish a connection with the scheduling server 108' via the communication network 206. This connection is depicted as "A" in FIG. 2. In an alternative non-limiting embodiment of the present invention, the communication session handling entity 112 can be operable to establish a connection with the scheduling server 108' via another communication network, another data network, a local connection, a dedicated connection and the like. The scheduling server 108 and the communication session handling entity 112 may implement a communication protocol for exchanging data, including scheduling data. An example of such communication protocol is "iCalendar" protocol, sometimes referred to by those of skill in the art as "iCal". This protocol is promulgated by the Internet Engineering Task Force Calendaring and Scheduling Working Group and is available from http://tools.ietf.org/html/2445. Using this protocol, the communication session handling entry 112 can interrogate the scheduling server 108 and, responsive to such interrogation, the scheduling server 108 can transmit to the communication session handling entity 112 scheduling data associated with a particular user whose details are included into the interrogation message. Other communication protocols, such as, but not limited to, XML, HTML, SOAP, RMI, CORBA, MAPI, WebDAV, CDO and the like can be used.

It should be noted that the auxiliary scheduling server 109 can be connected to the communication session handling entity 112 in substantially the same manner as the scheduling server 108' is connected to the communication session handling entity 112. In an alternative embodiment of the present invention, the auxiliary scheduling server 109 can be connected to the communication session handling entity 112 via a different connection from the connection used for the scheduling server 108'

It must be understood that the architecture presented with reference to FIG. 2 can be changed without departing from the teachings of the embodiments of the present invention and, as such, several components of the architecture of FIG. 2 can be modified, substituted or omitted. In one alternative non-limiting embodiment of the present invention, the functionality of the communication session handling entity 112 and the multi-party call entity 110 can be integrated into a single entity. In another non-limiting embodiment of the present invention, the functionality of the scheduling server 108' can be integrated with the functionality of the communication session handling entity 112 into a single entity. In yet another non-limiting embodiment of the present invention, the functionality of the scheduling server 108', the functionality of the communication session handling entity 112 and the functionality of the multi-party call entity 110 can be integrated into a single entity. In some embodiments of the present invention, the functionality of the auxiliary scheduling server 109 can be integrated with the functionality of the communication session handling entity 112, the scheduling server 108', and/or the multi-party call entity 110.

It should be also noted that the functionality of one or more of the scheduling server 108', the auxiliary scheduling server 109, the communication session handling entity 112 and the multi-party call entity 110 can be integrated into the communication devices 204a, 204b; the aforementioned computing devices 104a, 104b or any other entity connected to the communication network 206. Yet further non-limiting alternatives are possible.

Figure 4:
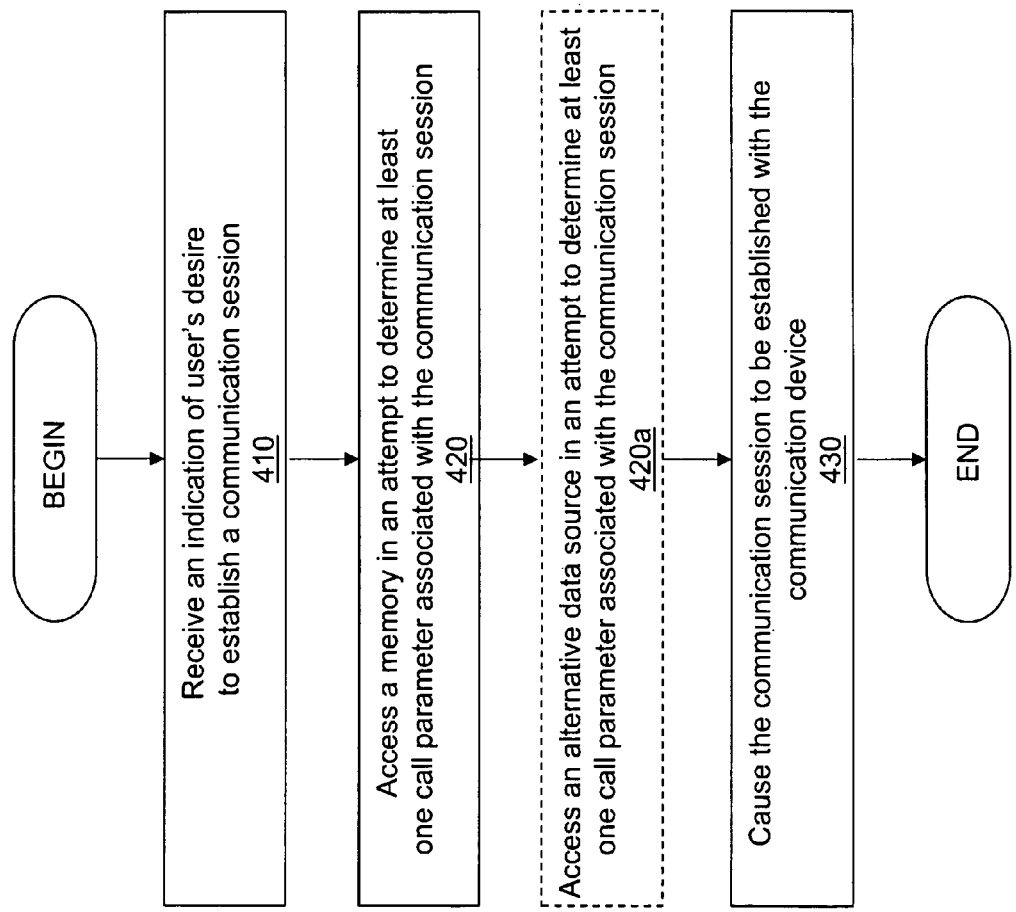
FIG. 4 depicts a flow chart of a method for handling establishment of a communication session according to one non-limiting embodiment of the present invention.

Given the architecture of FIG. 2, it is possible to implement a method of handling establishment of a communication session according to non-limiting embodiments of the present invention. Reference is now made to FIG. 4, which depicts a method for handling establishment of a communication session according to one specific non-limiting embodiment of the present invention.

The method can be conveniently executed at the communication session handling entity 112. For the purposes of the forthcoming discussion, it is useful to make certain assumptions that will be used for illustration purposes throughout the description to be presented herein below. The user 102a has scheduled a multi-party call for 2:00 pm and has provisioned a scheduling event that is maintained within the scheduling data maintained at the scheduling server 108 in association with the user 102a. The scheduling event contains a multi-party call dial-in number and a multi-party call identifier for accessing the multi-party call provided by the multi-party call entity 110. It is further assumed that the user 102a is desirous of initiating a communication session to join the multi-party call using the communication device 204a. The multi-party call is about to begin or, in other words, the user 102a wishes to initiate the communication session at approximately 1:58 pm. It should be explicitly understood that these assumptions are made for illustration purposes only and that one-skilled in the art will be able to adapt the description presented herein below to other circumstances.

Step 410

The method begins at step 410, where an indication of user's desire to establish a communication session is received. The user 102a can provide the indication of the user's desire to establish the communication session using the communication device 204a. Several alternative non-limiting embodiments are contemplated:

Establishing a Call to the Communication Session Handling Entity 112:

In a first non-limiting scenario, the user 102a can provide the indication of the user's desire to establish the communication session using the communication session handling feature contemplated herein by dialing a telephone number (or another suitable termination identifier) associated with the communication session handling entity 112. The telephone number associated with the communication session handling entity 112 can be a toll free number, a local access number or a premium toll number. Alternatively, any other suitable toll arrangement can be used for allowing the user 102a to establish a communication session with the communication session handling entity 112. In another non-limiting embodiment of the present invention, the communication session handling entity 112 can be reachable using another suitable termination identifier, such as an IP address, a SIP address and the like.

Clearly, in some non-limiting embodiments of the present invention, the user 102a may choose to pre-program and later activate a hot key or a soft key of the communication device 204a to use speed dial functionality to establish the call with the communication session handling entity 112.

The user 102a may find that by executing the method described in accordance with this non-limiting scenario, the user 102a need to remember (or pre-program using the speed dial functionality) one number associated with the communication session handling entity 112, which will then retrieve the particular number to be called associated with the particular communication session; rather then having to remember or retrieve individual numbers for individual communication sessions.

Keying in a Pre-Determined Sequence of Keys:

In a second non-limiting scenario, the user 102a can provide the indication of the user's desire to establish the communication session by keying in a pre-determined sequence of keys, such as, but not limited to "#76" or any other suitable combination of digits and/or symbols. The entry of the pre-determined sequence of keys can cause the communication device 204a to query the network element 206a, so that the network element 206a can determine how to handle the request from the communication device 204a.

The network element 206a can then access the aforementioned service mapping 302 and retrieve a record associated with the particular sequence of digits; for example, based on comparing the received sequence of digits with data stored within the digit sequence 304 field of the service mapping 302. Having determined that the digit sequence 304 field of the record 312 contains data that matches the received sequence of digits (i.e. "#76"), the network element 206a examines the content of the record 312 associated with the received sequence of digits. Specifically, the network element 206a retrieves the content of the service description 306 and, based on the content of the service description 306 field (ex. a termination identifier associated with the communication session handling entity 112), establishes a communication session between the communication device 204a and the communication session handling entity 112, using the telephone number (or another type of an identifier potentially contained in the service description 306 field) associated with the communication session handling entity 112.

Responding to a Reminder:

In this non-limiting scenario, the user 102a may be first reminded about an upcoming multi-party call by the communication session handling entity 112. For example, the communication session handling entity 112 can establish a communication session with the communication device 204a (or another device associated with the user 102a) to provide the user 102a with a reminder of the upcoming multi-party call. A method for providing such a reminder is disclosed in a PCT patent application, assigned to the Applicant and entitled "METHOD, SYSTEM AND APPARATUS FOR CONVEYING AN EVENT REMINDER" by Habib et al., which bears an application serial number PCT/CA2006/000648 and which was filed on Apr. 24, 2006; the content of which is herein incorporated by reference in its entirety. Alternatively, the reminder can be conveyed as an SMS message, a text message using an instant message application, an e-mail and the like.

Provided that such a reminder contains a reminder of a communication session that the user 102a has to establish (for example, to establish the communication session to join a multi-party call), after providing such a reminder, the communication session handling entity 112 can solicit from the user 102a the indication of the user's desire to establish the communication session as per the reminder. The user 102a can provide the indication of the user's desire to establish the communication session by:
  (i) keying in information using a keypad (such as "1" for "Yes" and "2" for "No"); or
  (ii) producing a speech utterance representative of the user's desire to establish the communication session (such as "Yes", "No", "Connect", "Call", "Initiate", "Establish" and the like);
  (iii) replying to the SMS message, replying to the e-mail message, replying to the text message, selecting a link in an e-mail message or in an instant messaging application, and the like.

Alternatively, the user 102a can indicate the user's desire to establish the communication session by one of many alternative methods. Examples of such alternative methods can include, but are not limited to:
  (i) transmitting an SMS message from the communication device 204a to the communication session handling entity 112;
  (ii) transmitting an SMS message from another communication device (not depicted) to the communication session handling entity 112;
  (iii) clicking a button or selecting a link on a web page or in an e-mail message;
  (iv) providing an appropriate command in a text messaging application;
  (v) etc.

Responsive to one of these actions by the user, the indication of the user's desire to establish a communication session is transmitted to the communication session handling entity 112. How the communication session handling entity 112 receives the indication of the user's desire to establish the communication session will depend on the exact method deployed. For example, in the non-limiting scenario of the user 102a generating and transmitting an SMS message, the communication session handling entity 112 can receive the SMS message and examine its content, for example, to extract an indication of the user identifier associated with the user 102a. This indication of the user identifier, can comprise, for example, a termination identifier of a device employed by the user 102a to transmit the SMS message. In the non-limiting scenario of the user 102a clicking a link to a web site, a web server hosting with the web site can transmit a message to the communication session handling entity to convey the indication of the user's desire to establish a communication session. In some embodiments of the present invention, the web server can further transmit an indication of the user identifier, which can be embodied, for example, in an IP address (or another identifier) associated with a computing apparatus employed by the user 102a to access the web site. In an alternative non-limiting embodiment, the web site can solicit from the user the indication of the user identifier and to transmit the received indication of the user identifier to the communication session handling entity 112.

The communication session handling entity 112 can also become aware of the termination identifier associated with a communication device from which the user 102a wishes to originate a communication session (for example, by examining the received SMS message or by receiving an indication of the termination identifier from the user 102a).

It should be noted that other ways for the communication session handling entity 112 to receive the indication of the user's desire to establish the communication session are possible.

As part of step 410, the communication session handling entity 112 can become aware of a user identifier associated with the user 102a (i.e. the user who had indicated the user's desire to establish the communication session). In some embodiments of the present invention, the user identifier can comprise a termination identifier associated with the communication device 204a employed by the user 102a to indicate the user's desire to establish the communication session.

In some embodiments of the present invention, the communication session handling entity 112 can examine the signalling information that has been used for establishing the call between the communication device 204a and the communication session handling entity 112 (such as SS7 signalling information, SIP signalling information and the like). By examining the signalling information, the communication session handling entity 112 can retrieve CLID information or another suitable indication of the termination identifier.

In the above-mentioned scenario, where the communication network 206 is embodied in the data network adapted for handling VoIP calls, the communication session handling entity 112 can examine the received SIP invite message in order to retrieve the IP address associated with the communication device 204a. In the above-mentioned scenario, where the communication network 206 is embodied in the PSTN, the communication session handling entity 112 can examine the SS7 signalling information, the Basic Rate Interface (BRI) or the Primary Rate Interface (PRI), in order to retrieve the telephone number associated with the communication device 204a.

In an alternative non-limiting embodiment of the present invention, the communication session handling entity 112 can interrogate the communication device 204a and request the communication device 204a to provide an indication of its termination identifier, which can comprise an IP address, a telephone number, a SIP address or any other suitable termination identifier associated with the communication device 204a (such as, but not limited to, a MAC address and the like).

In an alternative non-limiting embodiment of the present invention, another type of user identifier can be used, such as, but not limited to, an account number, a user number, a password or a combination thereof. In this non-limiting embodiment of the present invention, the communication session handling entity 112 can obtain the user identifier from the user 102a. In a first specific non-limiting example, the user 102a can key in the indication of the user identifier using a keypad of the communication device 204a. In a second specific non-limiting example, the user 102a can produce a speech utterance representative of the user identifier and the communication session handling entity 112 can capture the user identifier by applying speech recognition techniques known to those of skill in the art.

In yet alternative non-limiting embodiments of the present invention, the communication session handling entity 112 can obtain the user identifier from another source, such as, for example retrieve the user identifier from an SMS message, retrieve an IP address of a link clicked, retrieve an e-mail address from the e-mail message, retrieve a user identifier of the sender from the text messaging application and the like. The communication session handling entity 112 can then use the retrieved user identifier or can translate the user identifier to a termination identifier or another suitable type of the user identifier.

Step 420

Next, at step 420, the communication session handling entity 112 accesses a memory that maintains scheduling data in an attempt to determine at least one call parameter associated with the communication session that the user 102a wishes to establish. Specifically, the communication session handling entity 112 can access the scheduling server 108'. In a specific non-limiting embodiment of the present invention, the communication session handling entity 112 generates a request in accordance with a specific communication protocol shared by the scheduling server 108' and the communication session handling entity 112. In a non-limiting example, the request is generated in accordance with the "iCal" protocol. It should be noted that any other suitable communication protocol can be used.

The request can include the indication of the user identifier obtained at step 410 to enable the scheduling server 108' to retrieve scheduling data associated with the user 102a. Responsive to the receipt of the request, the scheduling server 108' retrieves scheduling data associated with the user 102a based on the user identifier received within the request from the communication session handling entity 112. Once the scheduling server 108' retrieves scheduling data associated with the user 102a, the scheduling server 108' examines the scheduling data in an attempt to locate a scheduling event which is associated with the time when the scheduling server 108' received the request or, effectively, associated with the time when the user 102a indicated the desire to establish the communication session.

Alternatively, the scheduling server 108' can attempt to locate a scheduling event which is to commence within a pre-defined time interval from the time when the scheduling server 108' received the request. In a specific non-limiting example, the scheduling server 108' attempts to locate a scheduling event which is to commence within 15 minutes from the time when the request was received. In an alternative non-limiting embodiment, any suitable time interval (such as 1 minute, 5 minutes, 10 minutes, 30 minutes and the like) before or after the time the request was received can be used. In another non-limiting embodiment of the present invention, the scheduling server 108' can attempt to locate a scheduling event which is "in progress" at the time when the request was received.

If the scheduling server 108' fails to locate an appropriate scheduling event or if the scheduling server 108' fails to locate scheduling data associated with the user 102a, the scheduling server 108' can execute an exception handling routine, such as, but not limited to, releasing an error message to the communication session handling entity 112.

If, on the other hand, the scheduling server 108' locates the appropriate scheduling event, in some embodiments of the present invention, the scheduling server 108' can retrieve the at least one call parameter from the scheduling data associated with the scheduling event. How the scheduling server 108' retrieves the at least one call parameter depends on how such call parameter has been provisioned:

Free-Form Entry

In this non-limiting scenario, the scheduling server 108' can apply content recognition logic to the content of the scheduling event in an attempt to retrieve the at least one call parameter. The content recognition logic is known to those of skill in the art and need not be described here in detail. Suffice it to say that using the content recognition logic, the scheduling server 108' looks for key words (such as "Multi-party call dial-in number", "Multi-party call Identifier", "Multi-party call ID", "Call-In Number" and the like), as well as applying pattern recognition (such as a set of digits in a specific pattern, ex. XXX-XXX-XXXX, X-XXX-XXX-XXXX or XXX-XXXX for the multi-party call dial-in number and XXXX or XXXXXX for the multi-party call identifier) to retrieve the multi-party call dial-in number and the multi-party call identifier. In an alternative non-limiting embodiment of the present invention, the content recognition logic can search for patterns indicative of an IP address, a SIP address and the like.

In an alternative non-limiting embodiment of the present invention, the scheduling server 108' can apply the content recognition logic to determine a termination identifier associated with a destination party, rather then looking for multi-party call details. In these embodiments of the present invention, the content recognition logic may be looking for patterns representative of a telephone number, an IP address, a SIP address or any other identifier that can be used as a termination identifier for reaching a potential destination party.

Structured Template Entry

In this non-limiting scenario, the scheduling server 108' can retrieve the at least one call parameter from the dedicated fields of the scheduling event (such as "Multi-party call Dial-in Number", "Multi-party call Identifier" or "Destination Number" fields).

Semi-Structured Template Entry

In this non-limiting scenario, the scheduling server 108' can apply the content recognition logic to a specific field of the scheduling event in substantially the same manner as was described above in respect to the free-form scenario.

The scheduling server 108' can then release the at least one call parameter to the communication session handling entity 112, in this specific non-limiting example using the iCal protocol.

In an alternative non-limiting embodiment of the present invention, the scheduling server 108' can send the scheduling data (or a subset thereof, such as, for example, a subset associated with the current day) associated with the user 102a to the communication session handling entity 112 and the communication session handling entity 112 can perform the look up for the specific scheduling event and/or extract the at least one call parameter from the scheduling data, as was described above.

In some embodiments of the present invention, the communication session handling entity 112 can be operable to announce to the user 102a the content of the retrieved scheduling event to verify with the user 102a whether the user 102a wishes to establish the communication session associated with the retrieved scheduling event. For example, the communication session handling entity 112 can synthesize a speech utterance representative of the scheduling data maintained within the retrieved scheduling event. Alternatively, the communication session handling entity 112 can transmit a text based confirmation message, such as, for example, an SMS message, an e-mail or a text message using an instant messaging application. In case that the user 102a provides a negative indication (for example, by keying a specific key on the communication device 204a, by producing an appropriate speech utterance, by responding to the SMS message, the e-mail or the text message) representative of the fact that the user 102a indeed desires to establish a communication session associated with a different scheduling event, the communication session handling entity 112 can present to the user 102a information about another scheduling event, which occurs before, after or concurrently with the retrieved scheduling event. Accordingly, the user 102a can select a particular scheduling event that corresponds to the communication session that the user 102a wishes to establish.

Alternative Enhancements

In some non-limiting embodiments of the present invention, an optional procedure for retrieving scheduling data from an alternative data source can be implemented. More specifically, the optional procedure for retrieving scheduling data from an alternative source can be implemented if the communication session handling entity 112 receives the error message from the scheduling server 109, the error message being indicative of either (a) there being no scheduling data available for the user 102a; or (b) that the scheduling data associated with the user 102a does not contain a scheduling event that is to commence at the time the request was received, within a specific time interval from the time that the request was received, or is in progress. In an alternative non-limiting embodiment of the present invention, the optional procedure for retrieving data from an alternative source can be implemented at the same time, before or after accessing the scheduling server 108', irrespective of the outcome of accessing the scheduling server 108'.

The communication session handling entity 112 can access the auxiliary scheduling server 109 in an attempt to retrieve at least one call parameter associated with the communication session that the user 102a wishes to establish. The interaction between the communication session handling entity 112 and the auxiliary scheduling server 109 can be implemented in substantially the same manner as the interaction between the communication session handling entity 112 and the scheduling server 108' or, alternatively, it can implement a different protocol, use a different communication network and the like.

This optional alternative enhancement is depicted in FIG. 4 in a broken line as step 420a. It should now be apparent that the communication session handling entity 112 can consult one or more data sources (such as, but not limited to, the scheduling server 108' and the auxiliary scheduling server 109) in an attempt to retrieve the at least one call parameter associated with the communication session the user 102a wishes to establish.

In a non-limiting embodiment of the present invention, where the scheduling server 108' and the auxiliary scheduling server 109 are contacted at the same time and in case that they both return respective data each containing at least one call parameter, an optional conflict resolution procedure can be implemented. For example, a scheduling event retrieved from a scheduling server that maintains business-related scheduling data can be given priority over a scheduling event retrieved from a scheduling server maintaining personal scheduling data (or vice versa). Alternatively, the user 102a can indicate his or her preference by pressing specific key, by producing an appropriate speech utterance, by replying to an SMS message, an e-mail message, a text message and the like.

Step 430

At this step, the communication session handling entity 112 causes the communication session to be established with the communication device 204a via the communication network 206 using the at least one call parameter obtained at step 420 or optional step 420a. More specifically, equipped with the at least one call parameter, the communication session handling entity 112 causes the communication session to be initiated from the communication device 204a:

a Call Connection has been Established Between the Communication Session Handling Entity 112 and the Communication Device 204a In some non-limiting embodiments of the present invention, a call connection has already been established between the communication device 204a and the communication session handling entity 112. This is particularly true in embodiments, where the indication of the user's desire to establish the communication session was provided by means of establishing a call between the communication device 204a and the communication session handling entity 112. The connection between the communication device 204a and the communication session handling entity 112 is to be referred to herein below as a "client leg" of the communication session.

In these embodiments, the communication session handling entity 112 establishes a connection to a destination party based on the at least one call parameter. In some embodiments of the present invention, the destination party can comprise the multi-party call entity 110. As such, the communication session handling entity 112 can establish a connection to the multi-party call entity 110 via the communication network 206 using the multi-party call dial-in number retrieved from the scheduling data. Once the connection between the communication session handling entity 112 and the multi-party call entity 112 is established, the communication session handling entity 112 provides the multi-party call identifier to the multi-party call entity 110, for example by generating DTMF tones representative of the multi-party call identifier. In a non-limiting alternative implementation, the communication session handling entity 112 can synthesize a speech utterance representative of the multi-party call identifier. The multi-party call identifier enables the multi-party call entity 110 to switch the call to the particular multi-party call associated with the multi-party call identifier. In an alternative non-limiting embodiment of the present invention, the multi-party call dial-in number can uniquely identify a particular multi-party call and, as such, there may be no need for the multi-party call identifier in these embodiments.

In an alternative non-limiting embodiment of the present invention, the destination party can comprise, for example, the communication device 204b associated with the user 102b. As such, the communication session handling entity 112 can establish a connection to communication device 204b via the communication network 206 using the at least one call parameter (ex. the termination identifier) retrieved from the scheduling data.

The connection between the communication session handling entity 112 and the destination party (ex. the multi-party call handling entity 110, the communication device 204b or any other destination party) is referred to herein below as the "connection leg" of the communication session. The communication session handling entity 112 then bridges the client leg and the connection leg of the call, effectively connecting the user 102a to the destination party (ex. the multi-party call handling entity 110, the communication device 204b or any other destination party).

No Call Connection has been Established Between the Communication Session Handling Entity 112 and the Communication Device 204a In alternative non-limiting embodiments of the present invention, no call has yet been established between the communication device 204a and the multi-party call entity 110. This is particularly true for embodiments where the user 102a has provided the indication of the user's desire to establish a communication session by using one of the above-described "out-of band" methods (ex. replied to a reminder, replied to an SMS message, sent an SMS message, sent an e-mail address, sent a text message and the like). It will be recalled that as part of the out-of-band method, the communication session handling entity can 112 become aware of the termination identifier associated with a communication device that the user 102a would like to establish a communication session from.

In these embodiments, the communication session handling entity 112 first establishes a client leg of the communication session by initiating a call to the communication device 204a using the termination identifier. The communication session handling entity 112 then establishes a connection leg of the communication session with the destination party (ex. the multi-party call handling entity 110, the communication device 204b or any other destination party) in substantially the same manner as was described immediately above. The communication session handling entity 112 then bridges the client leg and the connection leg of the communication session, effectively connecting the user 102a to the destination party (ex. the multi-party call handling entity 110, the communication device 204b or any other destination party).

Naturally, the communication session handling entity 112 can first establish the communication session with the destination party, then establish the communication session with the communication device 204a and then bridge the two legs of the communication session.

It should be noted that the method described above can be adapted and changed to suit alternative implementations without departing from the teachings of embodiments of the present invention.

Host Originated Multi-Party Calls

In a first alternative non-limiting embodiment of the present invention, the method for handling establishment of a communication session can be implemented in conjunction with the multi-party call entity 110, which in these embodiments is operable to deliver host originated multi-party calls. As described above, in such non-limiting embodiments, the multi-party call entity 110 is operable to establish a multi-party call by proactively initiating a call to the potential multi-party call participants rather then awaiting for the potential multi-party call participants to dial in.

In such a scenario, the method described above can be modified to improve flexibility as to how the host originated multi-party calls are handled. The user 102a, who is desirous of joining the host originated multi-party call indicates the user's desire to establish a communication session in substantially the same manner as was described above.

The communication session handling entity 112 receives the indication of the user's desire to establish the communication session and accesses the scheduling server 108'. The scheduling server attempts to locate scheduling data associated with the user 102a and the specific scheduling event, as was described in detail herein above.

The communication session handling entity 112 receives the at least one call parameter containing the identifier of the multi-party call entity 110 and the multi-party call identifier (if required); and transmits to the multi-party call entity 110 a trigger containing the user identifier associated with the user 102a (which can comprise, for example, a termination identifier associated with the communication device 204a) and the multi-party call identifier. The multi-party call entity 110 is then operable to cause the user 102a to join the multi-party call by establishing a call to the communication device 204a using the termination identifier received from the communication session handling entity 112.

Effectively, not only the user 102a has provided an indication of the user's desire to join the host-originated multi-party call, but also provided a termination identifier associated with the communication device which the multi-party call entity 110 should use to establish the host originated multi-party call with the user 102a.

Multi-Media Multi-Party Calls

In a second alternative non-limiting embodiment of the present invention, the method for handling establishment of a communication session can be implemented for handling establishment of a communication session to join a multi-media multi-party call, which can be provided by the multi-party call entity 110.

When the communication session handling entity 112 causes the communication session to be established from the communication device 204a to the multi-party call entity 110, the communication session handling entity 112 also interrogates the multi-party call entity 110 for the type of the multimedia components required for the multi-media multi-party call and transmits a trigger to the communication device 204a to invoke the necessary multimedia components, such as start executing a video conference application, a whiteboard sharing application and the like.

In an alternative non-limiting embodiment of the present invention, the at least one call parameter maintained within the scheduling data may require translation. As a non-limiting example, consider the following scenario. The at least one call parameter maintained within scheduling data may comprise a name associated with a destination party or another user identifier associated with the destination party (such as, for example, an e-mail address, an employee number and the like). In these non-limiting embodiments, a translation may be performed to translate the at least one call parameter into a different format. For example, a corporate directory may be accessed to translate the name associated with the destination party into a termination identifier associated with a communication device associated with the destination party. Other alternatives for the translation are also possible. This translation can be performed by the communication session handling entity 112, by the scheduling server 108', by the auxiliary scheduling server 109 or by another entity.

Optional Participant Verification Function:

In some non-limiting embodiments of the present invention, an optional participant verification function can be executed as part of the above-described step 430. This optional participant verification function can be useful, for example, for verifying participants before connecting them to a multi-party call. In these non-limiting embodiments, before causing the communication session to be established from the communication device 204a at step 430, the communication session handling entity 112 can first verify whether the user 102a is an allowed participant in the multi-party call by accessing scheduling data associated with the multi-party call organizer (for example, user 102b) in an attempt to determine at least one user identifier associated with at least one allowed multi-party call participant. Details of such a system for automatic participant verification using scheduling data are described in a patent application Ser. No. 12/159,438 assigned to the Applicant, entitled "METHOD, SYSTEM AND APPARATUS FOR PARTICIPANT VERIFICATION IN A MULTI-PARTY CALL ENVIRONMENT" by Horvath et al. and, for which the filing date and the filing serial number are not yet available; the content of which is incorporated herein by reference in its entirety.

An Optional Enhancement:

In an alternative embodiment of the present invention, the indication of the user's desire to establish the communication session (or a plurality of communication sessions) can be received in the following manner. The user 102a establishes a connection with the communication session handling entity 112 using one of the above-described methods, for example, by establishing a call to the communication session handling entity 112, by dialling a short code, by transmitting an SMS message, an e-mail, an instant text message or the like. In the process of interacting with the communication session handling entity 112, the user 102a indicates that she is desirous of being contacted at a communication device used for conveying the indication of the user's desire to establish a communication session or at a different communication device having a termination identifier, an indication of which can also be provided to the communication session handling entity 112. The user 102a can do this by interacting with a voice response system associated with the communication session handling entity 112 (ex. by providing one or more speech utterances or by generating DTMF tones), by responding to an SMS message, e-mail, instant text message and the like.

Upon receiving the indication of the user's desire, the communication session handling entity 112 can determine a user identifier associated with the user who has indicated the user's desire to establish the communication session and a termination identifier associated with the communication device used by the user 102a to convey the indication of the user's desire to establish the communication session (or a termination identifier associated with another communication device where the user 102a wishes to be contacted). It should be noted that in some non-limiting embodiments of the present invention, the user identifier can comprise the termination identifier. The communication session handling entity 112 can store this information in a database (not depicted). Effectively, the communication session handling entity 112 has received an indication of user's desire to establish one or more communication session or, put another way, the communication session handling entity 112 has received an activation signal at an activation time, the activation signal for triggering establishment of the one or more communication sessions.

In some embodiments of the present invention, the communication session handling entity 112 can store a flag based on the received indication of the user's desire to establish one or more communication sessions in association with a user identifier associated with the user 102a. Once the flag has been stored in association with the user identifier associated with the user 102a, the communication session handling entity 112, can from time to time (such as, for example, but not limited to, every 30 seconds, every minute, every 5 minutes, every 15 minutes, every 30 minutes, every hour and the like) access scheduling data associated with the user 102a using the user identifier to determine if it contains a scheduling event associated with a communication session which is to commence within a set period of time (such as for example, next minute, next 15 minutes, next 30 minutes, next hour and the like). If it determines that the scheduling data with the user contains a scheduling event that is to commence within the set period of time, the communication session handling entity 112 can establish the communication session using the termination identifier stored in the database and the at least one call parameter retrieved from the scheduling data (or at least one call parameter that is determined on the basis of another identifier stored in the scheduling data, such as, but not limited to, a name, an employee number, an e-mail address, an alias and the like).

In these non-limiting embodiments, the communication session handling entity 112 can then continue to monitor the scheduling data associated with the user 102a to determine if it contains another scheduling event associated with another communication session. Effectively, in some embodiments of the present invention, by providing the indication of the user's desire to establish the communication session in a form of the activation signal, the user 102a can trigger the communication session handling entity 112 to proactively check the scheduling data associated with the user 102a and, once a scheduling event associated with a communication session is located, to trigger establishment of the communication session using at least one call parameter contained in the scheduling data (or to provide an event reminder associated with the communication session to the user 102a). This can be repeated until the user 102a provides an indication of the user's desire to stop the proactive process performed by the communication session handling entity 112 or, in other words, until the communication session handling entity 112 receives a de-activation signal at a de-activation time and responsive to the receipt of the de-activation signal, the communication session handling entity 112 deletes the aforementioned flag. In another non-limiting embodiment of the present invention, the flag associated with the activation signal can expire upon meeting a pre-determined criterion, such as, for example, occurrence of a pre-determined event or upon expiration of a pre-determined time interval. For example, the flag can expire upon a pre-determined number of communication sessions associated with a pre-determined number of scheduling events have been established. In an alternative non-limiting embodiment of the present invention, the flag can expire upon the user 102a rejecting one or more reminders.

In alternative embodiments of the present invention, the received indication of the user's desire to establish one or more communication sessions can be indicative of how many communication sessions the user 102a wishes to establish or, in other words, how many scheduling events within the scheduling data associated with the user 102a should be used for establishing the respective number of communication sessions. For example, the user 102a may be desirous to trigger establishment of the next 5, 10, 15 or any other number of scheduled communication sessions from the time when the user 102a has indicated the user's desire to establish one or more communication sessions.

In an alternative embodiment of the present invention, the received indication of the user's desire to establish one or more communication sessions can be indicative of a time interval within which the user 102a is desirous to have the one or more communication sessions established. For example, the user 102a may be desirous to have one or more communication sessions that are scheduled to commence in the next 30 minutes, in the next hour, in the next 7 hours, before the end of the business day and the like to be established. Effectively, the user 102a can indicate a time interval to cause the one or more scheduling events commencing within this time interval to be used to trigger establishment of a respective communication session.

In an alternative non-limiting embodiment of the present invention, upon receiving the indication of the user's desire to establish one or more communication sessions, the communication session handling entity 112 can access the scheduling server 108' in an attempt to locate one or more scheduling events associated with one or more communication sessions that the user 102a wishes to establish. The communication session handling entity 112 can retrieve scheduling data associated with one or more scheduling events, including, but not limited to, data representative of a timing of the one or more communication sessions, data representative of a destination party for each one of the one or more communication sessions and the like. How the communication session handling entity 112 retrieves the scheduling data will depend on the type of the user's desire to establish one or more communication session. As was mentioned before, the indication of the user's desire to establish one or more communication sessions can comprise an indication of the number of communication sessions to be established or, in other words, a set of one or more communication sessions; a time interval and the like.

In some embodiments of the present invention, the communication session handling entity 112 can store the retrieved scheduling data in a database (not depicted) and trigger establishment of the one or more communication sessions when a start time associated with each of the one or more communication sessions occurs. In an alternative non-limiting embodiment of the present invention, the communication session handling entity 112 can transmit a trigger to one of the communication device 104a, the communication device 104b and the multi-party call entity 110; the trigger comprising the at least one call parameter for each of the one or more communication sessions and the start time associated with each of the one or more communication sessions to enable the communication device 104a, the communication device 104b, or the multiparty call entity 110 to act upon the trigger when the appropriate time occurs.

In an alternative non-limiting embodiment of the present invention, the flag indicative of the user's desire to establish one or more communication sessions can be generated and stored by the scheduling server 108'. In these embodiments of the present invention, the scheduling server 108' can generate the flag based on the user identifier associated with the user 102a who has indicated the user's desire to establish one or more communication sessions. In an alternative non-limiting embodiment of the present invention, the flags can be attached to respective scheduling event(s) associated with the user 102a. In these non-limiting embodiments of the present invention, the flags can be generated by the communication session handling entity 112 or by the scheduling server 108'.

In yet another alternative embodiment of the present invention, the communication session handling entity 112 can first establish a communication session with the user 102a using the termination identifier stored in the database to convey an event reminder. The communication session handling entity 112 can then query the user 102a to determine whether the user is desirous of establishing a communication session associated with the scheduling event in substantially the same manner as has been described above. It should be explicitly noted that the communication session to convey the reminder and the actual communication session associated with the scheduling event can be established with the same communication device or with different communication devices.

In these non-limiting embodiments of the present invention, the communication session handling entity 112 can cause establishment of the one or more communication sessions that start within a pre-determined time interval from the time when the user 102a has indicated the user's desire, or cause establishment of a certain number of communication sessions, or continue triggering establishment of the one or more communication sessions until a de-activation signal is received from the user 102a.

Figure 5A:
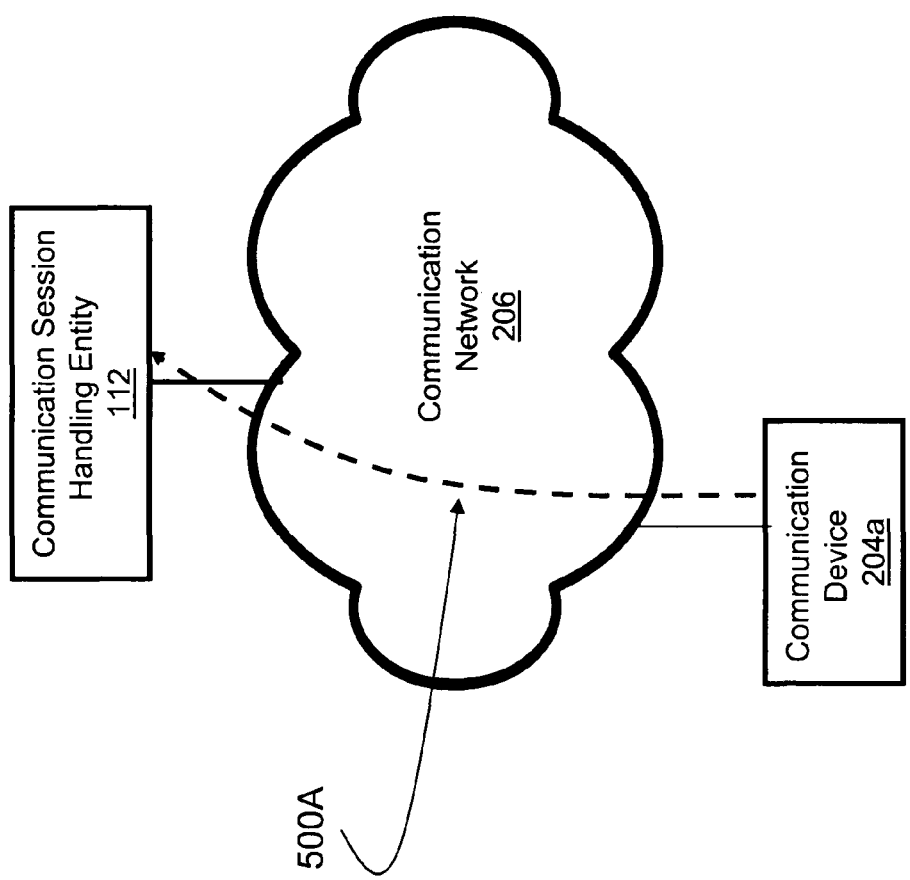
FIGS. 5A-5B depict signal flows according to various non-limiting embodiments of the present invention during a stage where an indication of user's desire to establish a communication session is received.
Figure 5B:
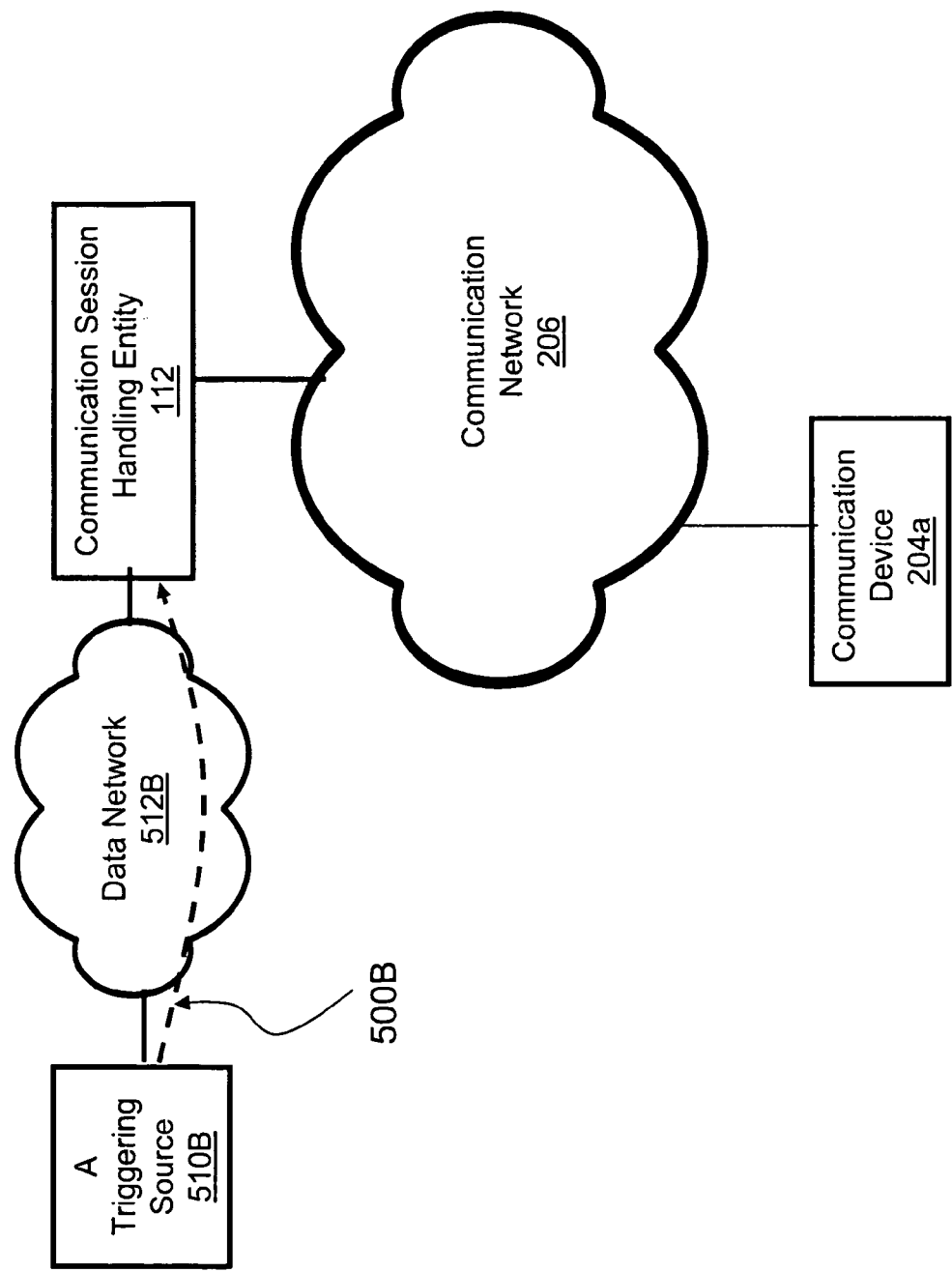

To illustrate the description presented herein above, several non-limiting examples of signal flows during various stages of a process for handling establishment of a communication session will now be described with reference to FIGS. 5A-5B, 6A-6C and 7A-7C. With reference to FIGS. 5A-5B, logical diagrams representing signal flows between components of the system of FIG. 2 during a stage where an indication of user's desire to establish a communication session is received are described.

FIG. 5A depicts a first non-limiting embodiment, where a signal 500A can be transmitted between the communication device 204a and the communication session handling entity 112 via the communication network 206 to convey the indication of the user's desire to establish the communication session. The signal 500A can be representative of a call established between the communication device 204A and the communication session handling entity 112. Alternatively, the signal 500A can be generated in response to the user 102a dialing a short code and a network element performing a look-up and call connection. In yet another alternative, the signal 500A can be an SMS message transmitted between the communication device 204A and the communication session handling entity 112. Yet in another alternative non-limiting embodiment, the signal 500A can be generated by the communication device 204A in response to the user 102a typing in an instant message in an instant message application, selecting a link, clicking a button using an appropriate user-input interface of the communication device 204A and the like. Yet further alternatives how the signal 500A is generated are possible.

FIG. 5B depicts another non-limiting embodiment of the signal flow during the stage where an indication of user's desire to establish a communication session is received. The architecture depicted in FIG. 5B is substantially similar to the architecture depicted in FIG. 5A, but it further comprises a triggering source 510B and a data network 512B. The triggering source can be a web site accessed by the user 102A, another communication device associated with the user 102A and the like. The data network 512B can comprise any suitable type of data network, such as a WAN, a LAN and the like. It should be noted that in some non-limiting embodiments of the present invention, the data network 512B can comprise a portion of the communication network 206 and vice versa. The triggering source 510B can generate a signal 500B and transmit the signal 500B to the communication session handling entity 112 via the data network 512B to convey the indication of the user's desire to establish the communication session. In a scenario where the triggering source 510B comprises a web site, the triggering source 510B can generate the signal 500B, for example, in response to the user 102A clicking a link or pressing a button on the web site. In an alternative non-limiting embodiment of the present invention, where the triggering source 510B is embodied in another communication device associated with the user, the triggering source 510B can generate the signal 500B in response to the user 102a typing in a message in an instant message application, the user 102a generating an SMS message, an e-mail message and the like. Yet other alternatives described above are possible.

Figure 6A:
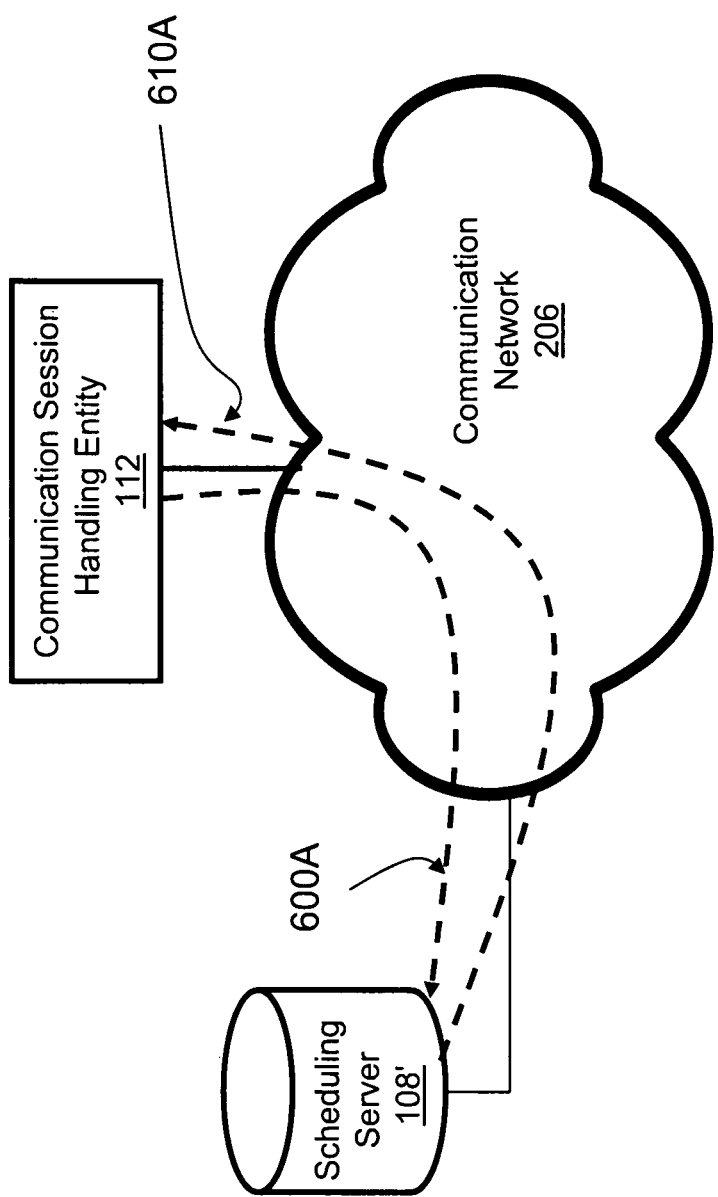
FIGS. 6A-6C depict signal flows according to various non-limiting embodiments of the present invention during a stage where a memory for maintaining scheduling data is accessed in an attempt to retrieve at least one call parameter.
Figure 6B:
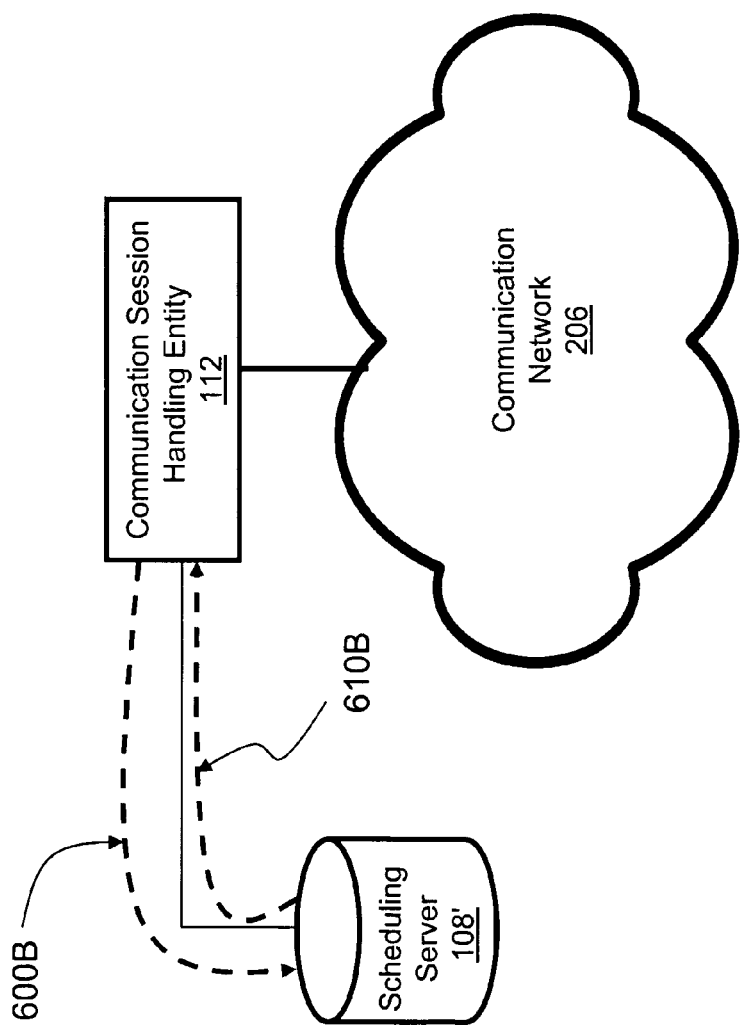
Figure 6C:
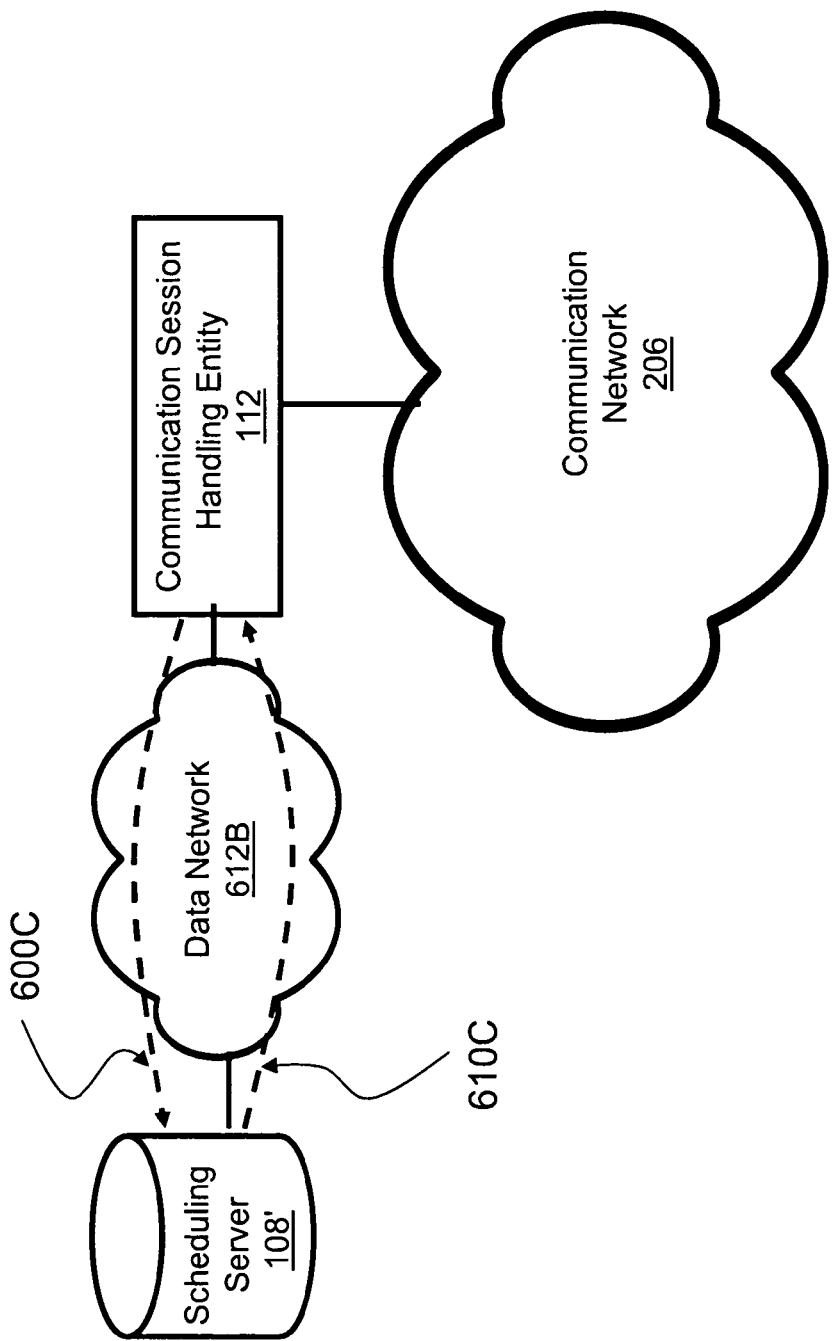

With reference to FIGS. 6A-6C, logical diagrams representing signal flows between components of the system of FIG. 2 during a stage where at least one call parameter associated with the communication session is retrieved from a memory for maintaining scheduling data are described.

FIG. 6A depicts a first non-limiting embodiment, where the communication session handling entity 112 can generate a signal 600A and transmit the signal 600A to the scheduling server 108' via the communication network 206 in an attempt to retrieve the at least one call parameter. In response to receipt of the signal 600A, the scheduling server 108' generates a signal 610A which it can transmit to the communication session handling entity 112 via the communication network 206. Signals 600A and 610A can be representative of the request transmitted from the communication session handling entity 112 to the scheduling server 108' in an attempt to retrieve the at least one call parameter and a response thereto respectively. How the signals 600A and 610A are generated, as well as various protocols for transmission thereof, have been described in detail herein above.

FIG. 6B depicts another non-limiting embodiment, in which the communication session handling entity 112 and the scheduling server 108' are coupled via a local connection. The local connection can be embodied in an Ethernet connection, a local area network, a wireless connection or any other suitable data connection. In this non-limiting scenario, the communication session handling entity 112 can generate the signal 600B and transmit the signal 600B via the local connection. Similarly, the scheduling server 108' can, in response to receipt of the signal 600B, generate a signal 610B and transmit the signal 610B to the communication session handling entity 112 via the local connection. Signals 600B and 610B can be representative of the request transmitted from the communication session handling entity 112 to the scheduling server 108' in an attempt to retrieve the at least one call parameter and a response thereto respectively. How the signals 600B and 610B are generated, as well as various protocols for transmission thereof, have been described in detail herein above.

FIG. 6C depicts another non-limiting embodiment, in which the communication session handling entity 112 is coupled to a data network 612B. The data network 612B can comprise any suitable type of data network, such as a WAN, a LAN and the like. It should be noted that in some non-limiting embodiments of the present invention, the data network 612B can comprise a portion of the communication network 206 and vice versa. Further coupled to the data network 612B can be the scheduling server 108'. In this non-limiting scenario, the communication session handling entity 112 can generate the signal 600C and transmit the signal 600C via the data network 612B to the scheduling server 108'. Similarly, the scheduling server 108' can, in response to receipt of the signal 600C, generate a signal 610C and transmit the signal 610C to the communication session handling entity 112 via the data network 612B. Signals 600C and 610C can be representative of the request transmitted from the communication session handling entity 112 to the scheduling server 108' in an attempt to retrieve the at least one call parameter and a response thereto respectively. How the signals 600C and 610C are generated, as well as various protocols for transmission thereof, have been described in detail herein above.

The communication between the auxiliary scheduling server 109 and the communication session handling entity 112 can be performed in substantially the same manner as described above with reference to communication between the scheduling server 108' and the communication session handling entity 112. It should be noted that the example arrangements presented with reference to FIGS. 6A-6C can be used interchangeably. For example, the communication between the communication session handling entity 112 and the scheduling server 108' can be implemented as described with reference to FIG. 6A, while the communication between the communication session handling entity 112 and the auxiliary scheduling server 109 can be implemented as described with reference to FIG. 6B. Naturally, other combinations are also possible.

Figure 7A:
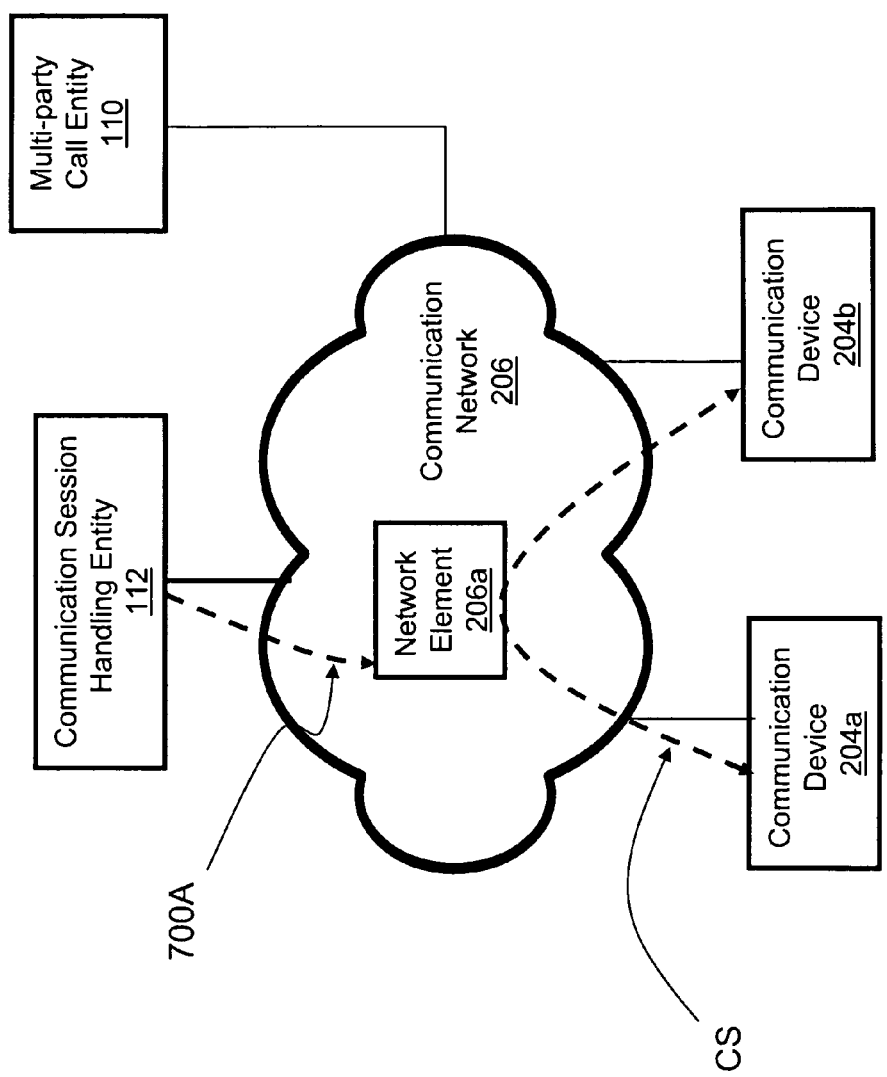
FIGS. 7A-7C depict signal flows according to various non-limiting embodiments of the present invention during a stage where a communication session is caused to be established.
Figure 7B:
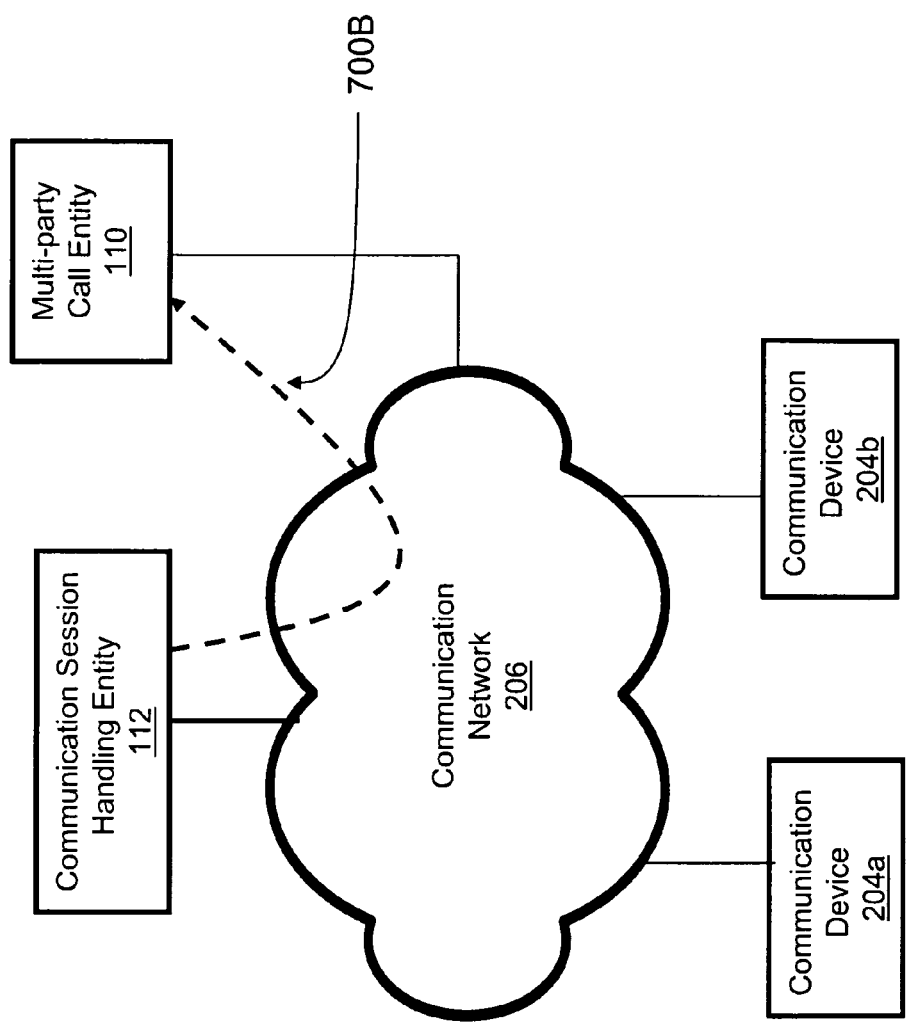
Figure 7C:
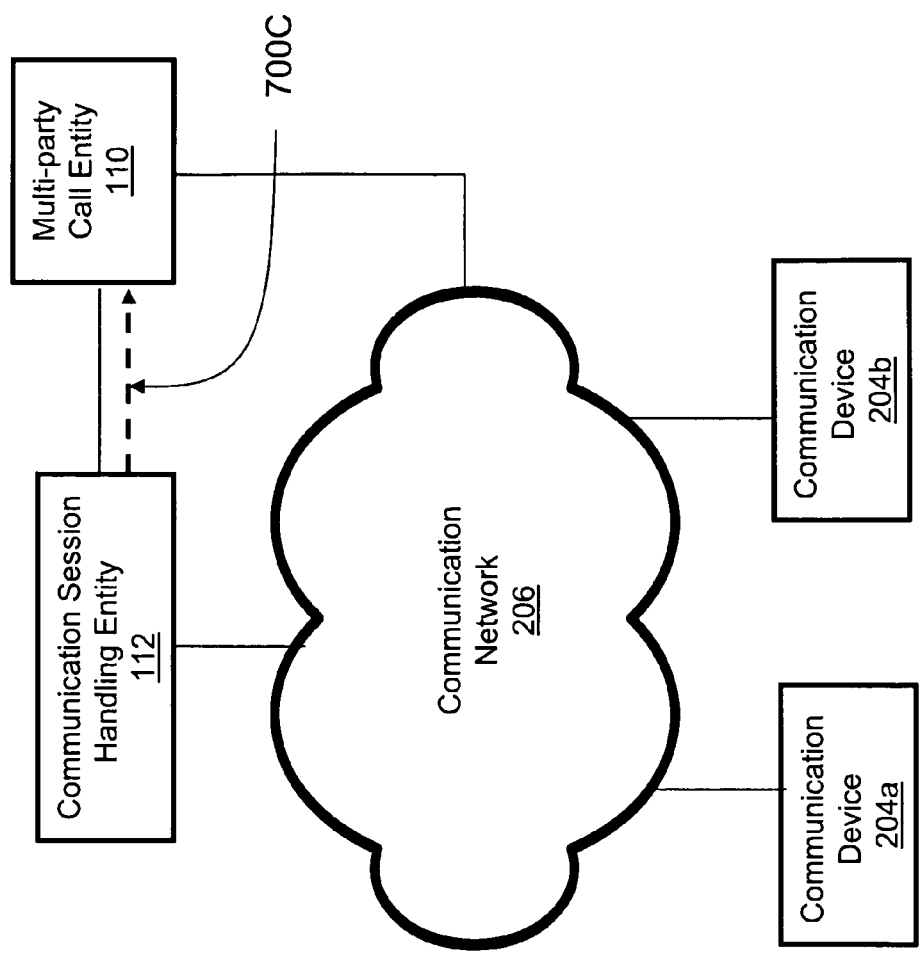

With reference to FIGS. 7A-7C, logical diagrams representing signal flows between components of the system of FIG. 2 during a stage where the communication session is established with a communication device associated with the user 102A are described.

FIG. 7A depicts a first non-limiting embodiment, where the communication session handling entity 112 can generate a signal 700A and issue the signal 700A towards the network element 206a serving the communication device 204a, the signal 700A containing a termination identifier associated with a destination party associated with the communication session. The network element 206a can trigger establishment of the communication session between the communication device 204a and the communication device 204b, the communication device 204b being associated with the termination identifier transmitted within signal 700A. This communication session is depicted as "CS" in FIG. 7A. It should be noted, that in an alternative embodiment of the present invention, the signal 700A can be sent to a network element servicing a communication device associated with the destination party. Alternatively, the signal 700A can be sent to the communication device 204a (or the destination communication device) and the communication device 204a (or the destination communication device) can trigger establishment of the communication session in accordance with the signal 700A.

FIG. 7B depicts another non-limiting embodiment, where the communication session handling entity 112 can generate a signal 700B and to transmit the signal 700B towards the multi-party call entity 110 via the communication network 206, the multi-party call entity 110 being the destination party associated with the communication session. The signal 700B can be, for example, representative of a call originated from the communication device 204a being forwarded to the multi-party call entity 110. In an alternative non-limiting embodiment of the present invention, the signal 700B can be representative of the communication session handling entity 112 establishing the aforementioned connection leg of the communication session. In yet another embodiment of the present invention, the signal 700B can be representative of a command transmitted between the communication session handling entity 112 and the multi-party call entity 110, the command being indicative of the multi-party call identifier. In yet another embodiment of the present invention, the signal 700B can be representative of a termination identifier associated with the communication device 204*a*, the signal 700B for enabling the multi-party call entity 110 to establish a call with the communication device 204*a*. Other alternatives that have been presented herein above are also possible.

FIG. 7C depicts another non-limiting embodiment, which can be substantially similar to the embodiment depicted with reference to FIG. 7B, but in the embodiment depicted in FIG. 7C, the communication session handling entity 112 can be coupled to the multi-party call entity 110 via a connection. The connection can be embodied in an Ethernet connection, a local area network, a wireless connection, a separate data network, a WAN or any other suitable data connection. The communication session handling entity 112 can generate a signal 700C and to transmit the signal 700C to the multi-party call entity 110 via the connection.

It should be noted that various alternatives of how the stage where the indication of the user's desire to establish the communication session can be implemented (ex. FIGS. 5A-5B), various alternatives of how the stage where at least one call parameter is retrieved from the memory for maintaining scheduling data can be implemented (ex. FIGS. 6A-6C), and various alternatives of how the stage where the communication session is caused to be established can be implemented (ex. FIGS. 7A-7C) can be combined in various arrangements and all the different combinations are within the scope of the embodiments of the present invention. Just as an example and not as a limitation, the stage where the indication of the user's desire is received can be implemented as described with reference to FIG. 5B, the stage where the at least one call parameter is retrieved can be implemented as described with reference to FIG. 6B and the stage where the communication session is caused to be established can be implemented as described with reference to FIG. 7C. In this specific non-limiting example, the communication session handling entity 112 may not need to be coupled to the communication network 206. It should be explicitly understood that other combinations are possible and are within the scope of embodiments of the present invention.

It should be further noted that various steps need not be implemented in a single apparatus and can be distributed among various entities. For example, a first entity can perform the stage where the indication of the user's desire to establish the communication session is received and a first portion of the stage where at least one call parameter is retrieved from the memory for maintaining scheduling data (i.e. to transmit a request for the scheduling data). A second entity can perform a second portion of the stage where at least one call parameter is retrieved from the memory for maintaining scheduling data (i.e. to receive the at least one call parameter) and the stage where the communication session is caused to be established.

Even though the foregoing description has been presented with reference to the user 102*a* using a computing apparatus to generate a scheduling event that includes at least one call parameter, it should be understood that when and how the user 102*a* generates the scheduling event and/or the at least one call parameter is not particularly limiting. For example, in some non-limiting embodiments of the present invention, the user 102*a* can use a voice interface to populate the scheduling events. In an alternative embodiment of the present invention, the time when the user provides at least one call parameter can be different from the time when the user generates the scheduling event. For example, the user 102*a* may provide an indication of at least one call parameter at a time of providing the aforementioned activation signal for one or more scheduling events that have been provisioned at an earlier time. Once again, it should be explicitly noted that how or when the scheduling event and/or the at least one call parameter is generated is immaterial, as long as the at least one call parameter (or another identifier that can be used for obtaining the at least one call parameter) is available at the time when the respective communication session is to be established.

Those skilled in the art will appreciate that certain functionality of the communication session handling entity 112, the scheduling server 108', the auxiliary scheduling server 109 and/or other elements of the infrastructure described herein may be implemented as pre-programmed hardware or firmware elements (e.g., application specific integrated circuits (ASICs), electrically erasable programmable read-only memories (EEPROMs), etc.), or other related components. In other embodiments, certain portions of the communication session handling entity 112, the scheduling server 108', the auxiliary scheduling server 109 and/or other elements may be implemented as an arithmetic and logic unit (ALU) having access to a code memory (not shown) which stores program instructions for the operation of the ALU. The program instructions could be stored on a medium which is fixed, tangible and readable directly by the communication session handling entity 112, the scheduling server 108', the auxiliary scheduling server 109 and/or other elements, (e.g., removable diskette, CD-ROM, ROM, fixed disk, USB drive), or the program instructions could be stored remotely but transmittable to the communication session handling entity 112, the scheduling server 108', the auxiliary scheduling server 109 and/or other elements via a modem or other interface device.

Persons skilled in the art will appreciate that there are yet more alternative implementations and modifications possible for implementing the present invention, and that the above implementations and examples are only illustrations of one or more embodiments of the present invention. The scope of the invention, therefore, is only to be limited by the claims appended hereto.

What is claimed is:

1. A method, implemented by a network-based communication session handling entity, for handling establishment of a communication session with a communication device associated with a user, the method comprising:
   receiving an indication of the user's desire to cause establishment of the communication session;
   determining a user identifier associated with the user;
   transmitting a request comprising the user identifier to a memory for maintaining scheduling data for a plurality of users, wherein the request is instrumental in causing said memory to: access scheduling data associated with the user using the user identifier, determine if the scheduling data associated with the user contains a scheduling event associated with the communication session, and release at least one call parameter maintained within the scheduling event;
   receiving the at least one call parameter associated with the communication session from the memory in response to the request; and
   causing the communication session to be established with the communication device associated with the user via a communication network using the at least one call parameter.

2. The method defined in claim 1, wherein said receiving an indication comprises receiving a call from the communication device associated with the user via the communication network.

3. The method defined in claim 2, wherein said call has been originated by one of:
   the user pressing a hot key;
   the user pressing a soft key;

the user dialing a telephone number associated with the communication session handling entity;

the user dialing a pre-defined sequence of keys on the communication device.

4. The method defined in claim 1, wherein said receiving an indication comprises at least one of:

receiving an SMS message;

receiving a text message via a text messaging application;

receiving an e-mail;

receiving an indication of the user's desire generated in response to the user clicking a button on a web page;

receiving an indication of the user's desire generated in response to the user clicking a button in an e-mail message;

receiving an indication of the user's desire generated in response to the user selecting a link on a web page; and receiving an indication of the user's desire generated in response to the user selecting a link in an e-mail message.

5. The method defined in claim 1, wherein said receiving an indication comprises:

transmitting a reminder to the user, the reminder associated with the communication session; and receiving from the user the indication of the user's desire to cause the establishment of the communication session in response to the user receiving the reminder associated with the communication session.

6. The method defined in claim 5, wherein said receiving from the user the indication of the user's desire to cause the establishment of the communication session in response to the user receiving the reminder associated with the communication session comprises one of:

receiving at least one pre-determined DTMF signal from the user;

receiving at least one speech utterance from the user;

receiving an SMS message;

receiving an e-mail;

receiving a text message.

7. The method defined in claim 5, wherein said transmitting a reminder to the user comprises one of:

establishing a call with the communication device associated with the user to convey the reminder;

transmitting an SMS message to the user, the SMS message to convey the reminder;

transmitting an e-mail to the user, the e-mail to convey the reminder; and transmitting a text message to the user, the text message to convey the reminder.

8. The method defined in claim 1, wherein said determining a user identifier comprises determining a termination identifier associated with the communication device associated with the user.

9. The method defined in claim 8, wherein said determining a termination identifier comprises examining signalling information used for establishing a call between the communication device and the communication session handling entity in an attempt to retrieve the termination identifier.

10. The method defined in claim 8, wherein said determining a termination identifier comprises requesting the communication device to provide an indication of the termination identifier.

11. The method defined in claim 1, wherein said determining a user identifier comprises interacting with the user in an attempt to obtain the user identifier.

12. The method defined in claim 11, wherein said interacting comprises one of:

receiving at least one DTMF signal, the at least one DTMF signal representative of the user identifier;

receiving a speech utterance, the speech utterance representative of the user identifier.

13. The method defined in claim 1, wherein said user identifier comprises a termination identifier associated with the communication device.

14. The method defined in claim 13, wherein said termination identifier comprises one of:

a telephone number;

a SIP address;

an IP address; and a proprietary identifier.

15. The method defined in claim 1, further comprising generating said request according to a communication protocol.

16. The method defined in claim 15, wherein said memory comprises a scheduling server; and wherein said communication protocol comprises an "iCal" protocol.

17. The method defined in claim 1, wherein said transmitting a request is further instrumental in causing said memory, in order to determine if the scheduling data contains a scheduling event associated with the communication session, to:

determine if the scheduling data contains a scheduling event that is to commence at a time the user has indicated the user's desire to cause the establishment of the communication session.

18. The method defined in claim 1, wherein said transmitting a request is further instrumental in causing said memory, in order to determine if the scheduling data contains a scheduling event associated with the communication session, to:

determine if the scheduling data contains a scheduling event that is to commence at a time which is within a predetermined interval from the time when the user has indicated the user's desire to cause the establishment of the communication session.

19. The method defined in claim 1, wherein said transmitting a request is further instrumental in causing said memory, in order to determine if the scheduling data contains a scheduling event associated with the communication session, to:

determine if the scheduling data contains a scheduling event that is in progress at a time the user has indicated the user's desire to cause the establishment of the communication session.

20. The method defined in claim 1, wherein [said memory is for maintaining scheduling data associated with at least one user; the scheduling data including at least one scheduling event; and wherein said transmitting a] the request is instrumental in causing said memory to:

release at least a portion of scheduling data associated with the user, the portion of scheduling data associated with the user comprising the at least one call parameter.

21. The method defined in claim 20, further comprising:

analyzing said at least a portion of scheduling data associated with the user in an attempt to retrieve the at least one call parameter.

22. The method defined in claim 1, further comprising:

announcing a communication session identifier associated with the communication session to the user;

receiving a confirmation from the user indicative of whether the user desires to cause the establishment of the communication session associated with the communication session identifier.

23. The method defined in claim 22, further comprising if the user provides a confirmation indicative of the user not desiring to cause the establishment of the communication associated with the communication session identifier:

retrieving a second call parameter;
announcing a second communication session identifier associated with a second communication session associated with the second call parameter and
receiving a confirmation from the user indicative whether the user desires to cause the establishment the communication session associated with the second communication session identifier.

24. The method defined in claim 23, wherein the communication session identifier comprises at least one of:
the at least one call parameter;
a subject associated with a scheduling event associated with the communication session;
a user identifier associated with a destination party associated with the communication session.

25. The method defined in claim 1, wherein said transmitting a request comprising the user identifier to a memory comprises transmitting the request to a first data source in an attempt to retrieve the at least one call parameter associated with the communication session; and wherein the method further comprises, if the attempt to retrieve the at least one call parameter from the first data source fails, transmitting the request to a second data source in an attempt to determine the at least one call parameter associated with the communication session.

26. The method defined in claim 25, wherein said first data source maintains one of business scheduling data and personal scheduling data and said second data source maintains the other one of business scheduling data and personal scheduling data.

27. The method defined in claim 1, wherein said transmitting a request comprising the user identifier to a memory comprises transmitting the request to a first data source and a second data source in an attempt to retrieve the at least one call parameter; and wherein said first data source maintains one of business scheduling data and personal scheduling data and said second data source maintains the other one of business scheduling data and personal scheduling data.

28. The method defined in claim 1, wherein said at least one call parameter comprises a multi-party call dial-in identifier and a multi-party call identifier; and wherein said causing the communication session to be established comprises:
causing the establishment of a communication session between the communication device and a multi-party call entity using the multi-party call dial-in identifier;
providing the multi-party call identifier to the multi-party call entity to cause the communication device to be connected to a multi-party call associated with the multi-party call identifier.

29. The method defined in claim 1, wherein said at least one call parameter comprises a destination termination identifier associated with a destination party; and wherein said causing the communication session to be established with the communication device associated with the user comprises:
causing the establishment of a client leg of the communication session, the client leg being a communication session between the communication device associated with the user and the communication session handling entity;
causing the establishment of a connection leg of the communication session, the connection leg being a communication session between the communication session handling entity and the destination party using the destination termination identifier associated with the destination party;
bridging the client leg and the connection leg of the communication session.

30. The method defined in claim 29, wherein said causing the establishment of a connection leg of the communication session is executed before said causing the establishment of a client leg of the communication session.

31. The method defined in claim 1, wherein said receiving an indication comprises receiving a call from the communication device associated with the user at the communication session handling entity; and wherein said at least one call parameter comprises a destination termination identifier associated with a destination party; and wherein said causing the communication session to be established with the communication device comprises:
causing the establishment of a connection leg of the communication session, the connection leg being a call between the communication session handling entity and the destination party using the destination termination identifier associated with the destination party;
bridging the call between the communication device associated with the user and the communication session handling entity with the connection leg of the communication session.

32. The method defined in claim 1, wherein said at least one call parameter comprises a multi-party call entity identifier and a host originated multi-party call identifier; and wherein said causing the communication session to be established comprises:
determining a termination identifier associated with the communication device;
transmitting a trigger to a multi-party call entity using the multi-party call entity identifier, the trigger comprising the termination identifier associated with the communication device and the host originated multi-party call identifier; said trigger being operable to cause the multi-party call entity to establish a host originated multi-party call with the communication device using the termination identifier.

33. The method defined in claim 1, wherein said at least one call parameter comprises a multi-party call dial-in identifier; and wherein said causing the communication session to be established comprises:
causing the establishment of a communication session between the communication device and a multi-party call entity using the multi-party call dial-in identifier.

34. The method defined in claim 1, wherein said at least one call parameter comprises a destination termination identifier associated with a destination communication device; and wherein said causing the communication session to be established comprises:
causing the establishment of a communication session between the communication device and the destination communication device using the destination termination identifier.

35. The method defined in claim 1, wherein said at least one call parameter comprises a destination termination identifier associated with a destination communication device; and wherein said causing the communication session to be established comprises:
transmitting a trigger comprising the destination termination identifier to the communication device associated with the user, the trigger for causing the communication device associated with the user to establish the communication session using the destination termination identifier.

36. The method defined in claim 1, wherein said at least one call parameter comprises a destination termination identifier associated with a destination communication device; and wherein said causing the communication session to be established comprises:

determining a termination identifier associated with the communication device;

transmitting a trigger comprising the termination identifier associated with the communication device associated with the user to the destination communication device using the destination termination identifier, the trigger for causing the destination communication device to establish the communication session using the termination identifier associated with the communication device associated with the user.

37. A system for handling establishment of a communication session with a communication device associated with a user, the system comprising:

a network-based communication session handling entity operable to:

receive from the user an indication of the user's desire to cause establishment of the communication session;

determine a user identifier associated with the user;

transmit a request comprising the user identifier to a memory for maintaining scheduling data for a plurality of users, wherein the request is instrumental in causing said memory to: access scheduling data associated with the user using the user identifier, determine if the scheduling data associated with the user contains a scheduling event associated with the communication session, and release at least one call parameter maintained within the scheduling event [in an attempt to retrieve at least one call parameter associated with the communication session using the user identifier];

receive the at least one call parameter associated with the communication session from the memory in response to the request; and cause the communication session to be established with the communication device associated with the user via a communication network using the at least one call parameter.

38. The system of claim 37, further comprising the communication device, wherein the communication device is operable to establish a call with the communication session handling entity via the communication network to convey the user's desire to cause the establishment of the communication session.

39. The system defined in claim 38, wherein said communication device is operable to establish a call with the communication session handling entity in response to:

the user pressing a hot key;

the user pressing a soft key;

the user dialing a telephone number associated with the communication session handling entity;

the user dialing a pre-defined sequence of keys on the communication device.

40. The system defined in claim 37, wherein to receive an indication of the user's desire to cause the establishment of the communication session, the communication session handling entity is operable to:

receive an SMS message;

receive a text message via a text messaging application;

receive an e-mail;

receive an indication of the user's desire generated in response to the user clicking a button on a web page;

receive an indication of the user's desire generated in response to the user clicking a button in an e-mail message;

receive an indication of the user's desire generated in response to the user selecting a link on a web page;

receive an indication of the user's desire generated in response to the user selecting a link in an e-mail message.

41. The system defined in claim 37, wherein to receive an indication of the user's desire to cause the establishment of the communication session, the communication session handling entity is operable to:

transmit a reminder to the user, the reminder associated with the communication session;

receive from the user the indication of the user's desire to cause the establishment of the communication session in response to the user receiving the reminder associated with the communication session.

42. The system defined in claim 41, wherein to receive from the user the indication of the user's desire to cause the establishment of the communication session in response to the user receiving the reminder associated with the communication session, the communication session handling entity is operable to perform one of:

receive at least one pre-determined DTMF signal from the user;

receive at least one speech utterance from the user;

receive an SMS message;

receive an e-mail;

receive a text message.

43. The system defined in claim 41, wherein to transmit a reminder to the user, the communication session handling entity is operable to perform one of:

establish a call with the communication device associated with the user to convey the reminder;

transmit an SMS message to the user, the SMS message to convey the reminder;

transmit an e-mail to the user, the e-mail to convey the reminder;

transmit a text message to the user, the text message to convey the reminder.

44. The system defined in claim 37, wherein to determine a user identifier, the communication session handling entity is operable to determine a termination identifier associated with the communication device associated with the user.

45. The system defined in claim 44, wherein to determine a termination identifier, the communication session handling entity is operable to examine signalling information used for establishing a call between the communication device and the communication session handling entity in an attempt to retrieve the termination identifier.

46. The system defined in claim 37, wherein to determine a user identifier, the communication session handling entity is operable to interact with the user in an attempt to obtain the user identifier.

47. The system defined in claim 46, wherein the communication session handling entity is further operable to:

receive at least one DTMF signal, the at least one DTMF signal representative of the user identifier.

48. The system defined in claim 46, wherein the communication session handling entity is further operable to:

receive a speech utterance, the speech utterance representative of the user identifier.

49. The system defined in claim 37, wherein said user identifier comprises a termination identifier associated with the communication device.

50. The system defined in claim 49, wherein said termination identifier comprises one of:

a telephone number;

a SIP address;

an IP address; and a proprietary identifier.

51. The system defined in claim 37, wherein the communication session handling entity is further operable to generate said request according to a communication protocol.

52. The system defined in claim 51, wherein said memory comprises a scheduling server; and wherein said communication protocol comprises an "iCal" protocol.

53. The system defined in claim 37, further comprising the memory.

54. The system defined in claim 53, wherein to determine if the scheduling data contains a scheduling event associated with the communication session, the memory is operable to:
    determine if the scheduling data contains a scheduling event that is to commence at a time the user has indicated the user's desire to cause the establishment of the communication session.

55. The system defined in claim 53, wherein to determine if the scheduling data contains a scheduling event associated with the communication session, the memory is operable to:
    determine if the scheduling data contains a scheduling event that is to commence at a time which is within a predetermined interval from the time when the user has indicated the user's desire to cause the establishment of the communication session.

56. The system defined in claim 53, wherein to determine if the scheduling data contains a scheduling event associated with the communication session, the memory is operable to:
    determine if the scheduling data contains a scheduling event that is in progress at a time the user has indicated the user's desire to cause the establishment of the communication session.

57. The system defined in claim 37, wherein said request is instrumental in causing said memory to:
    release at least a portion of scheduling data associated with the user to the communication session handling entity, the portion of scheduling data associated with the user comprising the at least one call parameter.

58. The system defined in claim 57, wherein the communication session handling entity is further operable to:
    analyze said at least a portion of scheduling data associated with the user in an attempt to retrieve the at least one call parameter.

59. The system defined in claim 37, said memory comprising a first data source; wherein the communication session handling entity is further operable to, if the attempt to determine at least one call parameter from the first data source fails:
    transmit the request to a second data source in an attempt to determine the at least one call parameter associated with the communication session.

60. The system defined in claim 59, wherein said first data source maintains one of business scheduling data and personal scheduling data and said second data source maintains the other one of the business scheduling data and personal scheduling data.

61. The system defined in claim 37, said memory comprising a first data source; the communication session handling entity being further operable to:
    transmit the request to a second data source in an attempt to determine the at least one call parameter associated with the communication session.

62. The system defined in claim 37, wherein the communication session handling entity is further operable to:
    announce a communication session identifier associated with the communication session to the user;
    receive a confirmation from the user indicative of whether the user desires to cause the establishment of the communication session associated with the communication session identifier.

63. The system defined in claim 62, wherein if the communication session handling entity receives a confirmation indicative of the user not desiring to cause the establishment of the communication associated with the communication session identifier, the communication session handling entity being further operable to:
    retrieve a second call parameter;
    announce a second communication session identifier associated with a second communication session associated with the second call parameter to the user; and
    receive a confirmation from the user indicative of whether the user desires to cause the establishment of the communication session associated with the second communication session identifier.

64. The system defined in claim 63, wherein the communication session identifier comprises at least one of:
    the at least one call parameter;
    a subject associated with a scheduling event associated with the communication session;
    a user identifier associated with a destination party associated with the communication session.

65. The system defined in claim 37, wherein said at least one call parameter comprises a multi-party call dial-in identifier and a multi-party call identifier; and wherein to cause the communication session to be established, the communication session handling entity is operable to:
    cause the establishment of a communication session between the communication device and the multi-party call entity using the multi-party call dial-in identifier;
    provide the multi-party call identifier to the multi-party call entity to cause the communication device to be connected to a conference bridge associated with the multi-party call identifier.

66. The system defined in claim 37, further comprising a multi-party call entity.

67. The system defined in claim 66, wherein said multi-party call entity and said communication session handling entity are embodied into a single apparatus.

68. The system defined in claim 37, wherein the at least one call parameter comprises a destination termination identifier associated with a destination party; and wherein to cause a communication session to be established, the communication session handling entity is operable to:
    cause the establishment of a client leg of the communication session, the client leg being a communication session between the communication device associated with the user and the communication session handling entity;
    cause the establishment of a connection leg of the communication session, the connection leg being a communication session between the communication session handling entity and the destination party using the destination termination identifier associated with the destination party;
    bridging the client leg and the connection leg of the communication session.

69. The system defined in claim 68, wherein the communication session handling entity is operable to cause the establishment of the connection leg of the communication session before the client leg of the communication session.

70. The system defined in claim 37, wherein said at least one call parameter comprises a host-originated multi-party call entity identifier and a host-originated multi-party call identifier; and wherein to cause the communication session to be established, the communication session handling entity is operable to:
  determine a termination identifier associated with the communication device;
  transmit a trigger to the host-originated multi-party call entity using the host-originated multi-party call entity identifier; the trigger comprising the termination identifier associated with the communication device and the host-originated multi-party call identifier; said trigger being operable to cause the multi-party call entity to establish a host originated multi-party call with the communication device using the termination identifier.

71. The system defined in claim 37, wherein said at least one call parameter comprises the destination termination identifier; and wherein to cause the communication session to be established, the communication session handling entity is operable to:
  cause the establishment of a communication session between the communication device and the destination communication device using the destination termination identifier.

72. The system defined in claim 37, wherein said at least one call parameter comprises a destination termination identifier associated with a destination communication device; and wherein to cause the communication session to be established, the communication session handling entity is operable to:
  transmit a trigger comprising the destination termination identifier to the communication device associated with the user, the trigger for causing the communication device associated with the user to establish the communication session using the destination termination identifier.

73. The system defined in claim 37, wherein said at least one call parameter comprises a destination termination identifier associated with a destination communication device; and wherein to cause the communication session to be established, the communication session handling entity is operable to:
  determine a termination identifier associated with the communication device;
  transmit a trigger comprising the termination identifier associated with the communication device associated with the user to the destination communication device using the destination termination identifier, the trigger for causing the destination communication device to establish the communication session using the termination identifier associated with the communication device associated with the user.

74. A network-based apparatus for handling establishment of a communication session with a communication device associated with a user, the apparatus comprising:
  means for receiving from the user an indication of the user's desire to cause establishment of the communication session;
  means for determining a user identifier associated with the user;
  means for transmitting a request comprising the user identifier to a memory for maintaining scheduling data for a plurality of users, wherein the request is instrumental in causing said memory to: access scheduling data associated with the user using the user identifier, determine if the scheduling data associated with the user contains a scheduling event associated with the communication session, and release at least one call parameter maintained within the scheduling event;
  means for receiving at least one call parameter associated with the communication session from the memory in response to the request; and
  means for causing the communication session to be established from a communication device associated with the user via a communication network using the at least one call parameter.

75. A method, implemented by a network-based communication session handling entity, for handling establishment of one or more communication sessions with a communication device associated with a user, the method comprising:
  receiving from the user an indication of the user's desire to cause establishment of the one or more communication sessions;
  determining a user identifier associated with the user;
  in response to receiving the indication of the user's desire to cause establishment of the communication session, accessing scheduling data associated with the user using the user identifier from a memory for maintaining scheduling data for a plurality of users, the scheduling data associated with the user comprising one or more scheduling events, each of the one or more scheduling events associated with a corresponding one of the one or more communication sessions;
  in response to at least one of the one or more scheduling events, causing the corresponding one of the one or more communication sessions to be established with the communication device associated with the user.

76. The method defined in claim 75, wherein each of the one or more scheduling events comprises an indication of a start time; and wherein said causing the corresponding one of the one or more communication sessions to be established comprises:
  causing the corresponding one of the one or more communication sessions to be established at a time approximate to the start time indicted within the at least one of the one or more scheduling events.

77. The method defined in claim 75, wherein said receiving from a user an indication of user's desire to cause establishment of the one or more communication sessions comprises receiving an indication of a set of the one or more scheduling events; and
  wherein said causing the corresponding one of the one or more communication sessions to be established comprises:
    in response to each of the one or more scheduling events within the set of the one or more scheduling events, causing the corresponding one of the one or more communication sessions to be established with the communication device associated with the user.

78. The method defined in claim 77, wherein said indication of a set of the one or more scheduling events comprises an indication of a predetermined number of scheduling events to respond to.

79. The method defined in claim 77, wherein each of the one or more scheduling events comprises an indication of a start time; wherein said indication of a set of the one or more scheduling events comprises an indication of a time interval; and wherein said set of the one or more scheduling events comprises scheduling events of the one or more scheduling events with a start time within the time interval.

80. The method defined in claim 77, wherein each of the one or more scheduling events comprises an indication of a start time; wherein said receiving an indication of a set of the one or more scheduling events comprises receiving an activation signal at an activation time and receiving a deactivation signal at a deactivation time; and wherein said set of the one or more scheduling events comprises scheduling events of the one or more scheduling events with a start time between the activation and deactivation times.

81. The method defined in claim 77, wherein the set of the one or more scheduling events comprises a plurality of the one or more scheduling events.

82. The method defined in claim 75, wherein said one or more communication sessions comprises a plurality of communication sessions and said one or more scheduling events comprises a plurality of scheduling events; wherein said receiving from a user an indication of user's desire to cause establishment of the one or more communication sessions comprises receiving from the user an indication of user's desire to cause establishment of the plurality of communication sessions; and wherein said causing the corresponding one of the one or more communication sessions to be established comprises: in response to each of the plurality of scheduling events, causing the corresponding one of the plurality of communication sessions to be established with the communication device associated with the user.

83. The method defined in claim 75, wherein said at least one of the one or more scheduling events comprises at least one call parameter associated with the corresponding one of the one or more communication sessions; and wherein said causing the corresponding one of the one or more communication sessions to be established comprises causing the corresponding one of the one or more communication sessions to be established using the at least one call parameter.

84. The method defined in claim 83, wherein the at least one call parameter comprises a termination identifier associated with a destination party associated with the corresponding one of the one or more communication sessions.

85. The method defined in claim 83, further comprising translating the at least one call parameter to derive a termination identifier associated with a destination party associated with the corresponding one of the one or more communication sessions.

86. The method defined in claim 75, wherein said causing the corresponding one of the one or more communication sessions to be established comprises:
conveying a reminder to the user, the reminder associated with the at least one of the one or more scheduling events;
receiving from the user an indication of the user's desire to have the corresponding one of the one or more communication sessions to be established;
responsive to said indication of the user's desire to have the corresponding one of the one or more communication sessions to be established being positive, causing the establishment of the corresponding one of the one or more communication sessions.

87. The method defined in claim 75, wherein said accessing scheduling data associated with the user comprises at least one of:
determining if the scheduling data associated with the user comprises a scheduling event that is to commence at a time the user has indicated the user's desire to cause the establishment of the one or more communication sessions;
determining if the scheduling data associated with the user comprises a scheduling event that is to commence at a time which is within a predetermined interval from the time when the user has indicated the user's desire to cause the establishment of the one or more communication sessions;
determining if the scheduling data associated with the user comprises a scheduling event that is in progress at a time the user has indicated the user's desire to cause the establishment of the one or more communication sessions.

88. The method defined in claim 75, wherein said accessing scheduling data associated with the user comprises:
determining if the scheduling data associated with the user comprises at least one scheduling event that is to commence after a time the user has indicated the user's desire to cause the establishment of the one or more communication sessions.

89. A system for handling establishment of one or more communication sessions with a communication device associated with a user, the system comprising:
a network-based communication session handling entity operable to:
receive from the user an indication of the user's desire to cause establishment of the one or more communication sessions;
determine a user identifier associated with the user;
in response to receiving the indication of the user's desire to cause establishment of the communication session, access scheduling data associated with the user using the user identifier from a memory for maintaining scheduling data for a plurality of users, the scheduling data associated with the user comprising one or more scheduling events, each of the one or more scheduling events associated with a corresponding one of the one or more communication sessions;
in response to at least one of the one or more scheduling events, cause the corresponding one of the one or more communication sessions to be established with a communication device associated with the user.

90. A network-based apparatus for handling establishment of one or more communication sessions with a communication device associated with a user, the apparatus comprising:
means for receiving from the user an indication of the user's desire to cause establishment of the one or more communication sessions;
means for determining a user identifier associated with the user;
means for accessing scheduling data associated with the user using the user identifier from a memory for maintaining scheduling data for a plurality of users, the scheduling data associated with the user comprising one or more scheduling events, each of the one or more scheduling events associated with a corresponding one of the one or more communication sessions, wherein the accessing scheduling data associated with the user is in response to receiving the indication of the user's desire to cause establishment of the communication session;
means for, in response to at least one of the one or more scheduling events, causing the corresponding one of the one or more communication sessions to be established with a communication device associated with the user.

* * * * *